United States Patent
Jito et al.

(10) Patent No.: US 9,299,984 B2
(45) Date of Patent: *Mar. 29, 2016

(54) LITHIUM SECONDARY BATTERY HAVING POSITIVE ELECTRODE ACTIVE MATERIAL INCLUDING LITHIUM TRANSITION METAL COMPOSITE OXIDE WITH PARTICLES OF RARE EARTH COMPOUND ADHERED THERETO

(75) Inventors: Daizo Jito, Kobe (JP); Takeshi Ogasawara, Kobe (JP); Atsushi Fukui, Kobe (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 930 days.

This patent is subject to a terminal disclaimer.

(21) Appl. No.: 12/984,262

(22) Filed: Jan. 4, 2011

(65) Prior Publication Data

US 2011/0165460 A1  Jul. 7, 2011

(30) Foreign Application Priority Data

Jan. 6, 2010 (JP) ................................ 2010-001321
Jul. 30, 2010 (JP) ................................ 2010-172122

(51) Int. Cl.
| | |
|---|---|
| *H01M 4/36* | (2006.01) |
| *H01M 4/485* | (2010.01) |
| *H01M 4/50* | (2010.01) |

(Continued)

(52) U.S. Cl.
CPC .............. *H01M 4/485* (2013.01); *H01M 4/134* (2013.01); *H01M 4/525* (2013.01); *H01M 4/62* (2013.01); *H01M 10/0525* (2013.01); *Y02E 60/122* (2013.01); *Y02T 10/7011* (2013.01)

(58) Field of Classification Search
CPC .......... H01M 4/26; H01M 4/485; H01M 4/50
USPC ............. 429/218.1, 231.1, 218.2, 223, 231.3, 429/224, 231.5, 231.6
See application file for complete search history.

(56) References Cited

U.S. PATENT DOCUMENTS 5,556,721 A * 9/1996 Sasaki et al. ................... 429/342
6,136,473 A * 10/2000 Furukawa et al. ......... 429/218.2

(Continued)

FOREIGN PATENT DOCUMENTS

| | | |
|---|---|---|
| EP | 1267431 A1 | 12/2002 |
| JP | 10-125327 A | 5/1998 |

(Continued)

OTHER PUBLICATIONS

European Search Report dated May 12, 2011, issued in corresponding European Patent Application No. 11000001.5.

(Continued)

*Primary Examiner* — Kenneth Douyette
(74) *Attorney, Agent, or Firm* — Westerman, Hattori, Daniels & Adrian, LLP

(57) ABSTRACT

A lithium secondary battery has a positive electrode (1) containing a positive electrode active material having particles of lithium cobalt oxide, a negative electrode (2) containing a negative electrode active material having silicon particles, a separator interposed between the positive electrode (1) and the negative electrode (2), and a non-aqueous electrolyte. Particles of erbium hydroxide or erbium oxyhydroxide are adhered to a surface of the lithium cobalt oxide particles in a dispersed form.

18 Claims, 4 Drawing Sheets

(51) Int. Cl.
*H01M 4/525* (2010.01)
*H01M 4/134* (2010.01)
*H01M 4/62* (2006.01)
*H01M 10/0525* (2010.01)

(56) References Cited

U.S. PATENT DOCUMENTS

| | | | |
|---|---|---|---|
| 2001/0024751 A1* | 9/2001 | Suzuki et al. | 429/223 |
| 2002/0071990 A1 | 6/2002 | Kweon et al. | |
| 2002/0142224 A1 | 10/2002 | Kweon et al. | |
| 2004/0018429 A1 | 1/2004 | Kweon et al. | |
| 2004/0043294 A1 | 3/2004 | Fukui et al. | |
| 2004/0191633 A1* | 9/2004 | Johnson et al. | 429/246 |
| 2005/0118511 A1* | 6/2005 | Park et al. | 429/324 |
| 2006/0177734 A1* | 8/2006 | Yao | 429/160 |
| 2006/0177739 A1 | 8/2006 | Endo et al. | |
| 2006/0246352 A1 | 11/2006 | Kweon et al. | |
| 2007/0077494 A1* | 4/2007 | Kobayashi et al. | 429/231.95 |
| 2008/0318131 A1 | 12/2008 | Watanabe et al. | |
| 2009/0087731 A1* | 4/2009 | Fukui et al. | 429/164 |
| 2009/0092892 A1* | 4/2009 | Yamaguchi et al. | 429/125 |
| 2010/0216035 A1* | 8/2010 | Iwanaga et al. | 429/338 |
| 2011/0117434 A1* | 5/2011 | Ogasawara et al. | 429/223 |

FOREIGN PATENT DOCUMENTS

| | | | |
|---|---|---|---|
| JP | 2000340229 | * | 12/2000 |
| JP | 2001-283845 A | | 10/2001 |
| JP | 2002-260637 A | | 9/2002 |
| JP | 2005-032693 A | | 2/2005 |
| JP | 2005-216651 A | | 8/2005 |
| JP | 2008-226495 A | | 9/2008 |
| JP | 2009-004316 A | | 1/2009 |
| JP | 2009-099523 A | | 5/2009 |
| JP | 2009-218217 A | | 9/2009 |
| WO | 2005/008812 A1 | | 1/2005 |
| WO | 2010/004973 A1 | | 1/2010 |

OTHER PUBLICATIONS

European Search Report dated May 31, 2013, issued in corresponding European patent application No. 13160442.3.

Japanese Office Action dated Feb. 26, 2014, issued in corresponding Japanese application No. 2010-172122 (3 pages).

* cited by examiner

LITHIUM SECONDARY BATTERY HAVING POSITIVE ELECTRODE ACTIVE MATERIAL INCLUDING LITHIUM TRANSITION METAL COMPOSITE OXIDE WITH PARTICLES OF RARE EARTH COMPOUND ADHERED THERETO

BACKGROUND OF THE INVENTION

1. Field of the Invention

The present invention relates to lithium secondary batteries, and more particularly to improvements of the positive electrode active material in a battery system using a negative electrode active material containing silicon.

2. Description of Related Art

Mobile information terminal devices such as mobile telephones, notebook computers, and PDAs have become smaller and lighter at a rapid pace in recent years. This has led to a demand for higher capacity batteries as the drive power source for the mobile information terminal devices. With their high energy density and high capacity, lithium-ion batteries, which perform charge and discharge by transferring lithium ions between the positive and negative electrodes, have been widely used as a driving power source for such mobile information terminal devices.

The mobile information terminal devices tend to power consumption as the functions of the devices, such as moving picture playing functions and gaming functions. It is strongly desired that the lithium-ion batteries that are the drive power source for the devices have further higher capacities and higher performance in order to achieve longer battery life and improved output power. In view of these circumstances, attempts have been made to use an aluminum alloy, a silicon alloy and a tin alloy, which can absorb a large amount of lithium per unit volume, as the negative electrode active material so that the discharge capacity of the lithium secondary battery can be increased.

In the lithium secondary battery that employs the just-described negative electrode active material, however, the negative electrode active material pulverizes or peels off from the negative electrode current collector because the negative electrode active material undergoes a great volumetric change during absorption and release of lithium. This causes breakage of the current collection structure in the negative electrode. As a consequence, electron conductivity within the negative electrode degrades, and the charge-discharge cycle performance becomes poor.

In view of the problem, Patent Document 1 discloses a negative electrode that achieves good cycle performance. This negative electrode is formed by sintering a negative electrode active material layer containing a polyimide binder and a negative electrode active material composed of a material containing silicon under a non-oxidizing atmosphere, in order to obtain good current collection capability within the electrode.

REFERENCES

Patent Documents

[Patent Document 1] Japanese Published Unexamined Patent Application No. 2002-260637

However, even when the current collection capability (electron conductivity) within the negative electrode is improved by the just-described technique, the charge-discharge performance is not improved sufficiently, because a large volumetric change occurs in the silicon during charge and discharge and the resulting fracture in the silicon particle surface causes a considerable degradation in the charge-discharge performance. The fracture in the silicon particle surface results in formation of a newly exposed surface, which is highly active, so a reductive decomposition reaction of the non-aqueous electrolyte takes place on the newly exposed surface. When the resultant product of the reductive decomposition reaction diffuses and migrates to the positive electrode side, it comes into contact with the positive electrode active material with a high potential, and consequently, the product of the reductive decomposition further undergoes an oxidative decomposition reaction on the positive electrode surface. This oxidative decomposition causes deposition of the oxidative decomposition product on the surface of the positive electrode active material particles, and it also causes generation of gas, which is also a kind of the oxidative decomposition product. The just-mentioned deposition of the oxidative decomposition product increases the charge-discharge reaction resistance at the interface between the surface of the positive electrode active material particles and the electrolyte solution, and it consequently degrades the charge-discharge performance. In addition, the generation of gas causes the battery thickness to increase, especially in the case of a flat-shaped battery, which results in a decrease in the energy density. Thus, there is still a problem that the battery performance (especially the charge-discharge cycle performance) degrades considerably when the above-described fractures form in the silicon particle surface.

BRIEF SUMMARY OF THE INVENTION

Accordingly, it is a primary object of the present invention to provide a lithium secondary battery having a high energy density and good charge-discharge cycle performance, by modifying the surface of the positive electrode active material particles to thereby inhibit the reductive decomposition product of the non-aqueous electrolyte, which forms on the silicon negative electrode active material particle surface during charge and discharge, from undergoing a further oxidative decomposition on the surface of the positive electrode active material particles even when the reductive decomposition product of the non-aqueous electrolyte diffuses and migrates to the positive electrode.

In order to accomplish the foregoing and other objects, the present invention provides a lithium secondary battery comprising: a positive electrode containing a positive electrode active material comprising particles of a lithium-transition metal composite oxide; a negative electrode containing a negative electrode active material comprising particles of silicon and/or a silicon alloy; a separator interposed between the positive electrode and the negative electrode; and a non-aqueous electrolyte, wherein particles of at least one rare earth compound are adhered to a surface of the particles of the lithium-transition metal composite oxide in a dispersed form, the at least one rare earth compound being selected from the group consisting of erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, europium hydroxide, europium oxyhydroxide, gadolinium hydroxide, gadolinium oxyhydroxide, lanthanum hydroxide, lanthanum oxyhydroxide, yttrium hydroxide, yttrium oxyhydroxide, scandium hydroxide, and scandium oxyhydroxide.

Because of the presence of the rare earth compound adhered to the surface of the lithium-transition metal composite oxide in a dispersed form, the just-described configuration makes it possible to inhibit the reductive decomposition product of the non-aqueous electrolyte from undergoing an oxidative decomposition on the positive electrode surface, even when a newly exposed surface, which is highly active, forms during charge and discharge in the surface of the negative electrode active material particles containing silicon and the like, producing the reductive decomposition product of the non-aqueous electrolyte on the newly exposed surface, and the reductive decomposition product diffuses and migrates to the positive electrode and comes into contact with the lithium-transition metal composite oxide. Accordingly, the oxidative decomposition product is prevented from depositing on the surface of the positive electrode active material particles, so the resistance increase resulting from the charge-discharge reaction is alleviated at the interface between the surface of the positive electrode active material particles and the electrolyte solution. As a result, the charge-discharge performance is prevented from degrading. Moreover, since the generation of gas, which is a kind of the oxidative decomposition product, is inhibited, the thickness of the battery (especially the flat-type battery) is prevented from increasing.

Although the details of the just-described workings of the rare earth hydroxide adhered to the surface of the lithium-transition metal composite oxide is not yet clear, such an effect is believed to be caused because the rare earth compound serves to increase the activation energy of the oxidative decomposition reaction of the reductive decomposition product of the non-aqueous electrolyte at the lithium-transition metal composite oxide surface and to cause the reaction less easily, i.e., the rare earth compound exhibits what is called negative catalysis.

It is desirable that the lithium-transition metal composite oxide have a layered structure and be represented by the chemical formula $Li_aNi_xCO_yM_zO_2$, where $0 \leq a \leq 1.1$, $x+y+z=1$, $0 \leq x \leq 1$, $0 \leq y \leq 1$, $0 \leq z \leq 1$, and M is at least one element selected from the group consisting of Mn, Al, Zr, Mg, Ti, and Mo.

The foregoing problem of the oxidative decomposition of the reductive decomposition product of the non-aqueous electrolyte, which results from the reductive decomposition product having been formed on the highly active newly exposed surface that diffuses and migrates to the positive electrode and comes into contact with the positive electrode active material, becomes more serious when the lithium-transition metal composite oxide contains nickel and cobalt as described above. However, such a problem is significantly reduced when the particles of the rare earth compound are adhered to the surface of the lithium-transition metal composite oxide particles in a dispersed form as in the above-described configuration.

It is desirable that $0 \leq z \leq 0.4$ in the lithium-transition metal composite oxide represented by the chemical formula $Li_aNi_xCO_yM_zO_2$.

The reason is that the positive electrode capacity degrades if the proportion of M is too high.

It is desirable that $0 \leq x \leq 0.05$, $0.95 \leq y \leq 1.00$, and $0 \leq z \leq 0.05$ in the lithium-transition metal composite oxide represented by the chemical formula $Li_aNi_xCO_yM_zO_2$.

When the Co content is relatively high, the positive electrode capacity becomes high, and moreover, the operating voltage of the battery also becomes high. As a result, the capacity density and energy density of the battery can be increased.

It is desirable that $0.2 \leq x \leq 0.6$, $0.2 \leq y \leq 0.6$, and $0 < z \leq 0.4$ in the lithium-transition metal composite oxide represented by the chemical formula $Li_aNi_xCO_yM_zO_2$.

The positive electrode active material containing Ni, Co, and M in the predetermined amounts can enhance thermal stability and therefore improve the reliability of the battery.

It is desirable that $0.70 \leq x < 0.90$, $0.10 \leq y \leq 0.25$, and $0 < z \leq 0.10$ in the lithium-transition metal composite oxide represented by the chemical formula $Li_aNi_xCO_yM_zO_2$.

When the Ni content is relatively high, the positive electrode capacity is even higher. As a result, the battery capacity can be increased.

It is desirable that the group of rare earth compounds consist of erbium hydroxide and erbium oxyhydroxide.

With erbium hydroxide and erbium oxyhydroxide, the above-described advantageous effects can be exhibited more significantly.

It is desirable that the particles of the at least one rare earth compound have an average particle size of from 1 nm to 100 nm.

The reason why the average particle size of the particles of the rare earth compound is restricted is as follows. The reason why the average particle size of the particles of the rare earth compound is restricted is as follows. If the average particle size exceeds 100 nm, the surface of the lithium-transition metal composite oxide particles cannot be covered densely with the rare earth compound because the particle size of the rare earth compound relative to the particle size of the lithium-transition metal composite oxide particles is too large. As a consequence, the area in which the lithium-transition metal composite oxide particle is directly in contact with the non-aqueous electrolyte and the reductive decomposition product thereof is great, so the oxidative decomposition of the non-aqueous electrolyte and the reductive decomposition product thereof increases. Consequently, the charge-discharge performance degrades. On the other hand, if the average particle size is less than 1 nm, the surface of the lithium-transition metal composite oxide particles is exceedingly covered with the rare earth compound. As a consequence, the performance of absorption and release of lithium ions at the surface of the lithium-transition metal composite oxide particles becomes poor, and the charge-discharge performance degrades. Taking this into consideration, it is more preferable that the average particle size of the particles of the rare earth compound be within the range of from 10 nm to 50 nm.

The present invention makes it possible to inhibit the reductive decomposition product of the non-aqueous electrolyte from undergoing oxidative decomposition on the positive electrode active material surface. This enables to prevent deposition of the oxidative decomposition product on the surface of the positive electrode active material particles and thereby to inhibit degradation of the charge-discharge performance resulting from the increase of the charge-discharge reaction resistance at the interface between the surface of the positive electrode active material particles and the electrolyte solution. Moreover, the generation of gas, which is a kind of the oxidative decomposition product, can be inhibited, so it is made possible to prevent a battery thickness increase in a flat-type battery. Thus, the present invention can achieve both an improvement in the charge-discharge cycle performance and an increase of the energy density at the same time.

DETAILED DESCRIPTION OF THE INVENTION

Hereinbelow, the present invention is described in further detail. It should be construed, however, that the present invention is not limited to the following preferred embodiments but various changes and modifications are possible without departing from the scope of the invention.

Preparation of Positive Electrode (1) Preparation of Lithium-Transition Metal Composite Oxide $Li_2CO_3$ and $CoCO_3$ were mixed in a mortar so that the mole ratio of Li and Co became 1:1. Thereafter, the mixture was sintered in the air at 800° C. for 24 hours and then pulverized to obtain powder of lithium cobalt oxide represented as $LiCoO_2$ (having an average particle size of 11 µm).

(2) Erbium Hydroxide Coating by a Wet Method 1,000 g of the above-described lithium cobalt oxide was added to 3 liters of pure water and stirred to prepare a suspension in which lithium cobalt oxide was dispersed. Thereafter, a solution in which 1.85 g of erbium nitrate pentahydrate was dissolved was added to the just-mentioned suspension. When adding the solution in which erbium nitrate pentahydrate was dissolved to the suspension, 10 mass % of aqueous sodium hydroxide solution was added thereto to keep the pH of the solution containing the lithium cobalt oxide to 9. Next, the resultant suspension was vacuum filtrated and then washed with water, and the resultant powder was heat-treated (dried) at 120° C. Thus, positive electrode active material powder in which erbium hydroxide was adhered uniformly to the surface of the lithium cobalt oxide was obtained.

Figure 4:
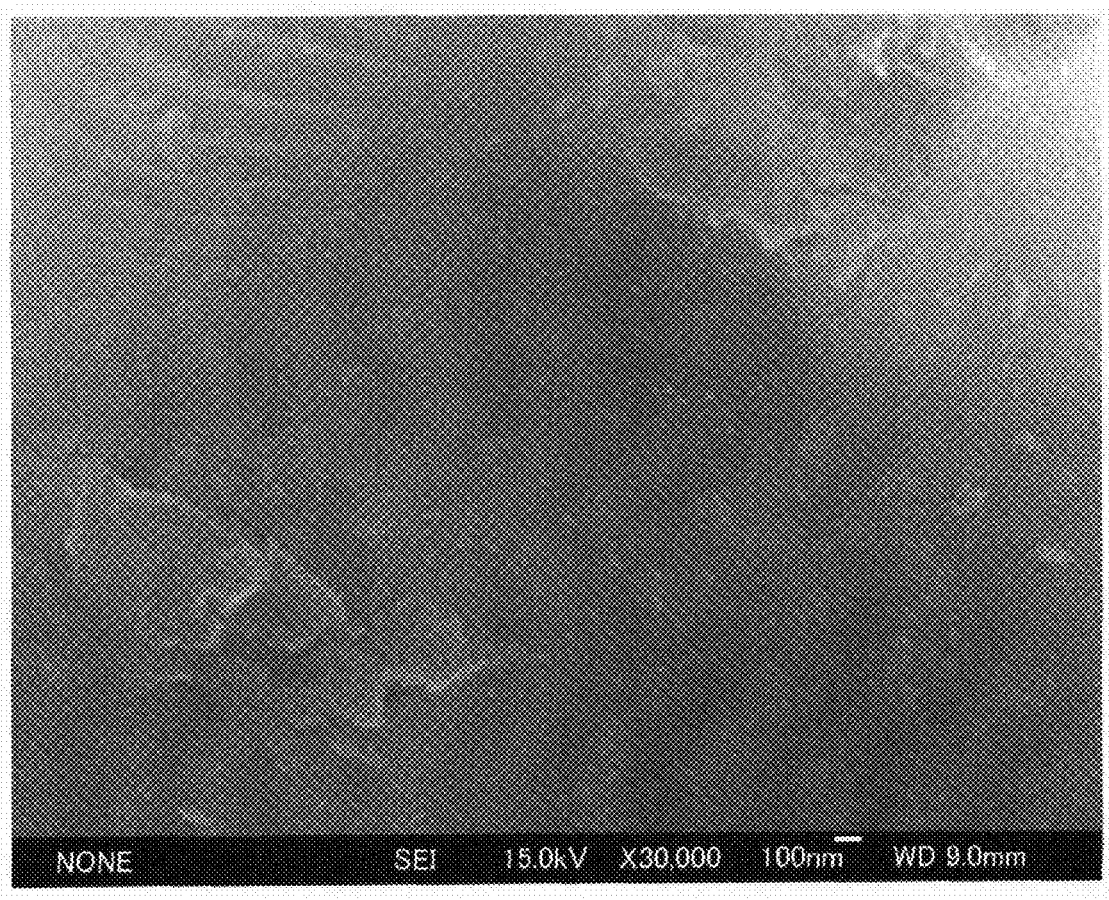
FIG. 4 is a SEM photograph taken when a positive electrode active material was observed by a scanning electron microscope (SEM).

The resultant positive electrode active material powder was observed with a scanning electron microscope (SEM). As a result, it was found that, as shown in FIG. 4, an erbium compound (erbium hydroxide) with an average particle size of 100 nm or less was adhered in a uniformly dispersed form to the surface of the lithium cobalt oxide uniformly. The amount of the adhering erbium compound was measured by ICP, and it was found that the amount of the adhering erbium compound was 0.07 mass % in terms of elemental erbium based on the mass of the lithium cobalt oxide.

(3) Preparation of Positive Electrode

The positive electrode active material powder prepared in the above-described manner, carbon black (acetylene black) powder having an average diameter of 30 nm as a positive electrode conductive agent, and polyvinylidene fluoride as a positive electrode binder were added to NMP (N-methyl-2-pyrrolidone) as a dispersion medium so that the mass ratio of the positive electrode active material powder, the positive electrode conductive agent, and the positive electrode binder became 95:2.5:2.5. Thereafter, the mixture was kneaded to prepare a positive electrode mixture slurry.

Next, the resultant positive electrode mixture slurry was applied onto both sides of a positive electrode current collector made of an aluminum foil (thickness 15 µm, length 402 mm, width 50 mm) so that the length of the applied area was 340 mm on one side and 270 mm on the other side and the width of the applied area was 50 mm on both sides. Thereafter, the positive electrode current collector coated with the positive electrode active material was dried and pressure-rolled, to thus prepare a positive electrode. The amount of the positive electrode active material layer was 48 mg/cm$^2$ and the thickness of the positive electrode was 148 µm, measured at the portion where the active material layers were formed on both sides. In addition, an aluminum plate serving as a positive electrode current collector tab was connected to an end portion of the positive electrode on which no positive electrode active material layer was formed.

Preparation of Negative Electrode (1) Preparation of Silicon Negative Electrode Active Material First, a polycrystalline silicon ingot was prepared by thermal reduction. Specifically, silicon seeds placed in a metal reactor (reducing furnace) were heated to 800° C., and a mixed gas of purified hydrogen and a gas vapor of high-purity monosilane ($SiH_4$) was flowed therein. Thus, polycrystalline silicon was deposited on the surfaces of the silicon seeds. Thereby, a polycrystalline silicon ingot was formed into a thick rod shape.

Next, the polycrystalline silicon ingot was pulverized and classified, whereby polycrystalline silicon particles (negative electrode active material particles) having a purity of 99% were prepared. The polycrystalline silicon particles had a crystallite size of 32 nm and a median particle diameter of 10 µm. The crystallite size was calculated from the half-width of silicon (111) peak measured by a powder X-ray diffraction analysis, using Scherrer's formula. The median particle diameter was defined as a particle diameter at 50% cumulative volume in a particle size distribution measurement by a laser diffraction analysis.

(2) Preparation of Negative Electrode Mixture Slurry

The above-described negative electrode active material powder, graphite powder having an average particle size of 3.5 µm as a negative electrode conductive agent, and a negative electrode binder were mixed together with NMP as a dispersion medium. The negative electrode binder was composed of a thermoplastic polyimide resin precursor varnish (solvent: NMP, concentration: 47 mass %, determined as the amount of the polyimide resin after polymerization and imidization by a heat treatment) having a molecular structure represented by the following chemical formula (1) (where n is an integer equal to or greater than 1) and a glass transition temperature of 300° C. The mass ratio of the negative electrode active material powder, the negative electrode conductive agent powder, and the polyimide resin after imidization in the mixture was 89.5:3.7:6.8. Thus, a negative electrode mixture slurry was prepared.

Here, the varnish, which is the precursor of the polyimide resin, may be made from 3,3'4,4'-benzophenone tetracarboxylic acid diethyl esters represented by the following chemical formulae (2), (3), and (4) and m-phenylenediamine represented by the following chemical formula (5). The 3,3'4,4'-benzophenone tetracarboxylic acid diethyl esters represented by the following chemical formulae (2), (3), and (4) may be prepared by reacting 3,3'4,4'-benzophenone tetracarboxylic dianhydride represented by the following chemical formula (6) with 2 equivalent weight of ethanol in the presence of NMP.

Chemical formula (1)

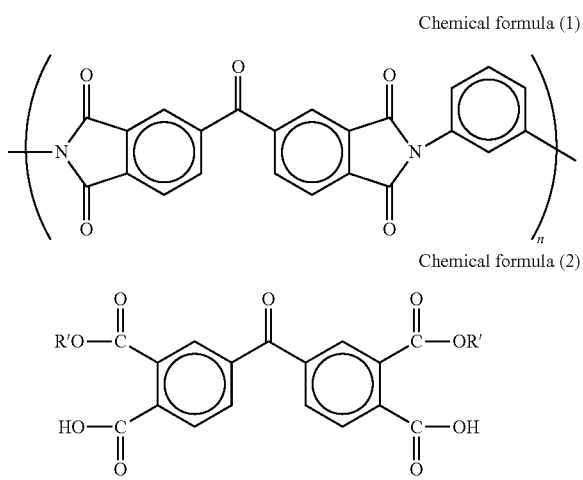

Chemical formula (2)

In the formula, R' is an ethyl group.

Chemical formula (3)

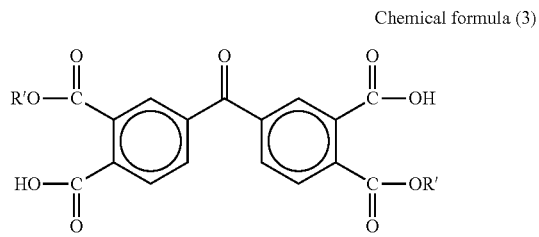

In the formula, R' is an ethyl group.

Chemical formula (4)

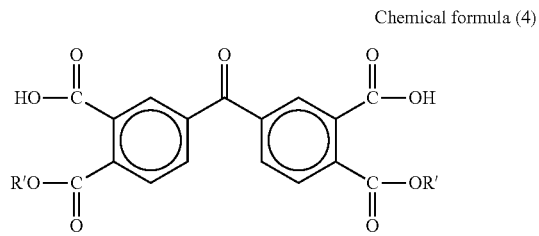

In the formula, R' is an ethyl group.

Chemical formula (5)

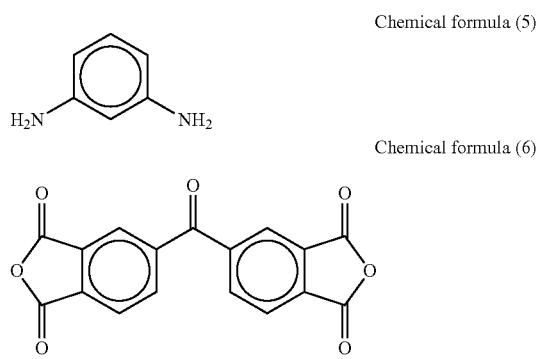

Chemical formula (6)

(3) Preparation of Negative Electrode

A negative electrode current collector was prepared as follows. Both sides of a 18 μm-thick copper alloy foil (C7025 alloy foil, containing 96.2 mass % of Cu, 3 mass % of Ni, 0.65 mass % of Si, and 0.15 mass % of Mg) were roughened by an electrolytic copper roughening process so as to have a surface roughness Ra (defined by Japanese Industrial Standard (JIS) B 0601-1994) of 0.25 μm and a mean spacing of local peaks S (also defined by JIS B 0601-1994) of 1.0 μm. The negative electrode mixture slurry prepared in the foregoing manner was applied onto both sides of the negative electrode current collector in the air at 25° C., then dried in the air at 120° C., and thereafter pressure-rolled in the air at 25° C. The resultant article was cut out into a rectangular shape with a length of 380 mm and a width of 52 mm, and thereafter subjected to a heat treatment under an argon atmosphere at 400° C. for 10 hours, to thus prepare a negative electrode in which negative electrode active material layers were formed on the surfaces of the negative electrode current collector. The amount of the negative electrode active material layer on the negative electrode current collector was 5.6 mg/cm$^2$, and the thickness of the negative electrode was 56 μm.

Then, a nickel plate serving as a negative electrode current collector tab was connected to an end portion of the negative electrode.

Preparation of Non-Aqueous Electrolyte Solution

Lithium hexafluorophosphate (LiPF$_6$) was dissolved at a concentration of 1.0 mol/L in a mixed solvent of 10:10:80 volume ratio of fluoroethylene carbonate (FEC), propylene carbonate (PC), and methyl ethyl carbonate (MEC). Thereafter, 0.4 mass % of carbon dioxide gas was dissolved into the resultant solution, to thus prepare a non-aqueous electrolyte solution.

Preparation of Electrode Assembly

Using a sheet of the above-described positive electrode, a sheet of the above-described negative electrode, and two sheets of separators made of a microporous polyethylene film having a thickness of 20 μm, a length of 450 mm, and a width of 54.5 mm and having a penetration resistance of 340 g and a porosity of 39%, the positive electrode and the negative electrode were disposed facing each other with a separator interposed between them. Next, the positive and negative electrodes with the separators were spirally wound using a winding core rod having a diameter of 18 mm. At this time, the positive electrode tab and the negative electrode tab were disposed so that both tabs were located at the outermost roll of each of the electrodes. Subsequently, the winding core rod was drawn out to prepare a spirally-wound electrode assembly, and then, the spirally-wound electrode assembly was compressed to prepare a flat-type electrode assembly.

Preparation of Battery

The above-described flat-type electrode assembly and the electrolyte solution prepared in the foregoing manner were put into an aluminum laminate battery case in a CO$_2$ atmosphere at 25° C. and 1 atm, so that a flat-type lithium secondary battery was prepared. The design capacity of the secondary battery is 1,000 mAh when charged to 4.20 V.

Figure 1:
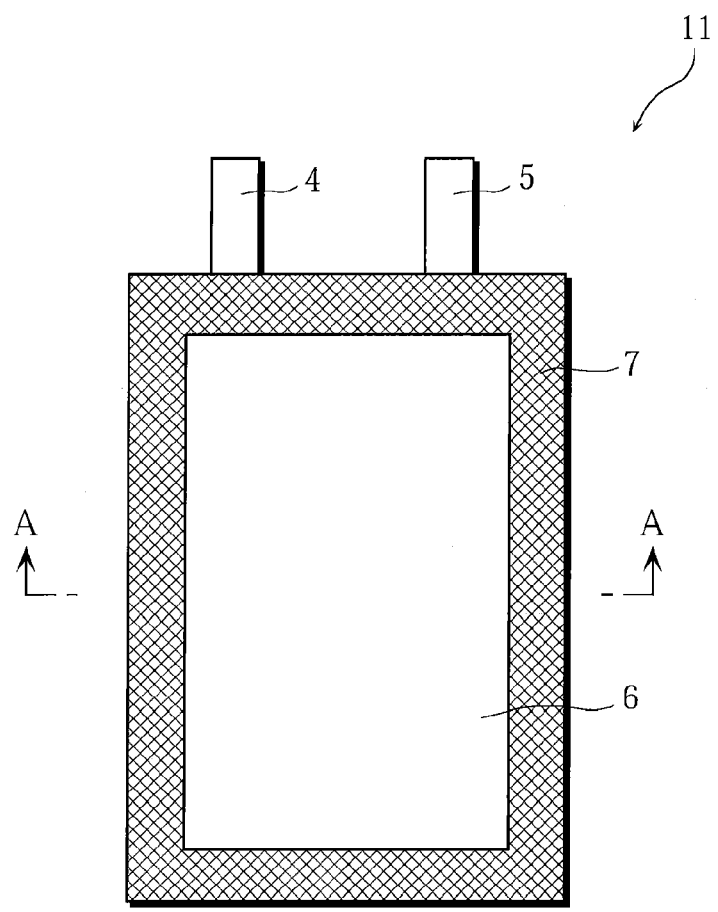
FIG. 1 is a front view of a test cell used for the embodiments of the present invention.
Figure 2:
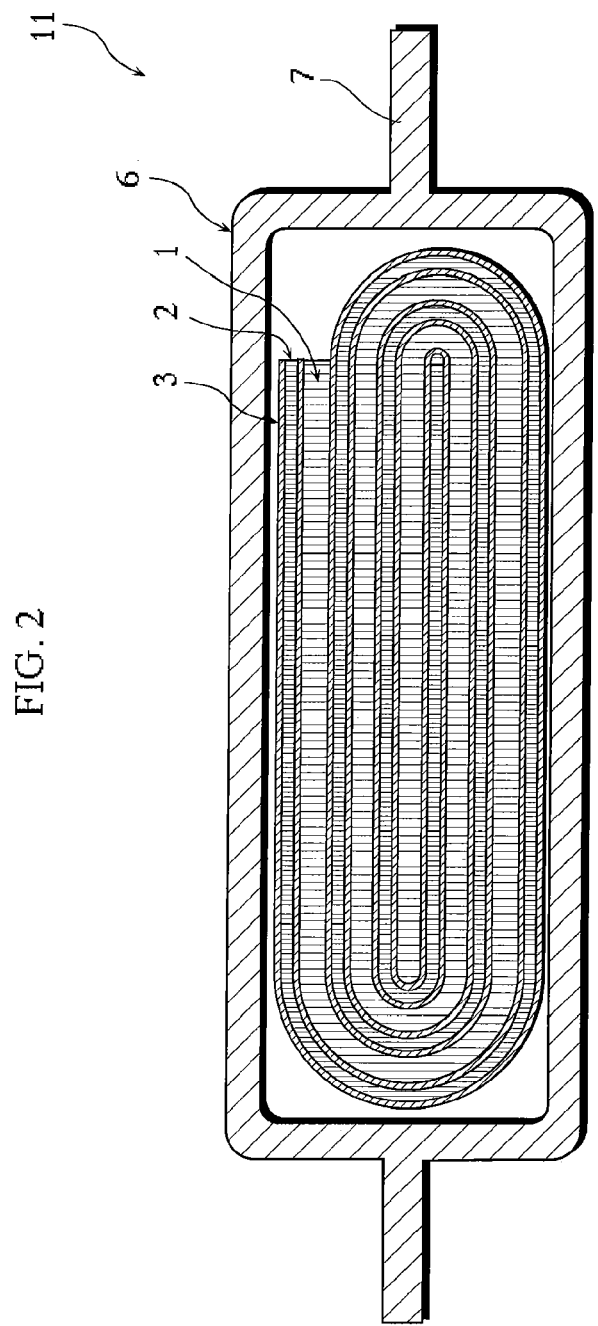
FIG. 2 is a cross-sectional view taken along line A-A in FIG. 1.

The specific structure of the lithium secondary battery 11 is as follows. As illustrated in FIGS. 1 and 2, a positive electrode 1 and a negative electrode 2 are disposed so as to oppose each other across a separator 3. The non-aqueous electrolyte solution is impregnated in a flat-type electrode assembly comprising the positive electrode 1, the negative electrode 2, and the separator 3. The positive electrode 1 and the negative electrode 2 are connected to a positive electrode current collector tab 4 and a negative electrode current collector tab 5, respectively, so as to form a structure that enables charging and discharging as a secondary battery. The electrode assembly is disposed in a space within an aluminum laminate battery case 6 having a sealed part 7, at which opposing peripheral edges of the aluminum laminate are heat sealed.

EXAMPLES

First Group of Examples

Example 1

A battery fabricated in the same manner as described in the foregoing embodiment was used as the battery of Example 1.

The battery fabricated in this manner is hereinafter referred to as Battery A1 of the invention.

Example 2

A battery was fabricated in the same manner as described in Example 1 above, except that the heat-treatment temperature for the powder obtained by vacuum filtrating the suspension and further washing it with water was set at 300° C. When the heat treatment is carried out at 300° C., all of or most of the erbium hydroxide changes into erbium oxyhydroxide, so the erbium oxyhydroxide is adhered to the surface of the lithium cobalt oxide particles in a dispersed form. However, a small portion of the erbium hydroxide may remain in the form of erbium hydroxide (without changing into erbium oxyhydroxide), so it is possible that erbium hydroxide may exist on the surface of the lithium cobalt oxide particle. It should be noted that the compound adhered to the surface of the lithium cobalt oxide particles in a dispersed form herein may be referred to as erbium oxyhydroxide, taking into consideration that all or most of the erbium hydroxide changes into erbium oxyhydroxide.

The battery fabricated in this manner is hereinafter referred to as Battery A2 of the invention.

Comparative Example 1

A battery was fabricated in the same manner as described in Example 1 above, except that 2.06 g of zirconium oxyhydroxide dihydrate was used in place of erbium nitrate pentahydrate. The temperature of the heat treatment was 120° C., and the amount of zirconium with respect to lithium cobalt oxide was 0.07 mass %.

The battery fabricated in this manner is hereinafter referred to as Comparative Battery Z1.

Comparative Example 2

A battery was fabricated in the same manner as described in Example 1 above, except for using, as the positive electrode active material, one in which no erbium hydroxide particle was adhered to the surface of the lithium cobalt oxide.

The battery fabricated in this manner is hereinafter referred to as Comparative Battery Z2.

Experiment

Batteries A1 and A2 of the invention as well as Comparative Batteries Z1 and Z2 were charged and discharged under the following conditions to determine their charge-discharge cycle performance (cycle life and battery thickness increase). The results are shown in Table 1 below.

Temperature in the Experiment
  25° C. and 45° C.
Charge-Discharge Conditions
  Charge Conditions for the First Cycle
  Each of the batteries was charged at a constant current of 50 mA for 4 hours, thereafter charged at a constant current of 200 mA until the battery voltage reached 4.20 V, and further charged at a constant voltage of 4.20 V until the current value reached 50 mA.
  Discharge Conditions for the First Cycle
  Each of the batteries was discharged at a constant current of 200 mA until the battery voltage reached 2.75 V.
  Charge Conditions for the Second Cycle to the 500th Cycle
  Each of the batteries was charged at a constant current of 1000 mA until the battery voltage reached 4.20 V and thereafter charged at a constant voltage of 4.20 V until the current value reached 50 mA.
  Discharge Conditions for the Second Cycle to the 500th Cycle
  Each of the batteries was discharged at a constant current of 1000 mA until the battery voltage reached 2.75 V.
Measurement of Cycle Life
  The charge-discharge cycling was stopped at the time when the capacity retention ratio determined by the following equation (1) reached 60%, and the number of cycles at which the charge-discharge cycling was stopped was defined as the cycle life of the battery.

$$\text{(Discharge capacity } Q2 \text{ at the n-th cycle/Discharge capacity } Q1 \text{ at the 2nd cycle)} \times 100 \quad \text{Eq. (1)}$$

Figure 3:
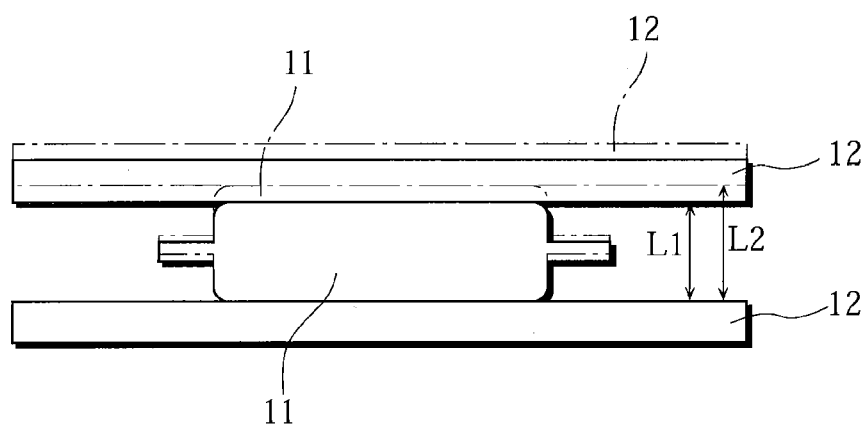
FIG. 3 is a view for illustrating how a battery thickness is measured.

Measurement of Battery Thickness
  As illustrated in FIG. 3, the two faces of the battery 11 having the largest area were sandwiched by two flat plates 12. The distance between the two flat plates 12 (i.e., the battery thickness) was measured after the discharge in the first cycle and after the charge-discharge cycle test. The battery thickness after the discharge in the first cycle was defined as L1 (hereinafter simply referred to as battery thickness L1), and the battery thickness after the charge-discharge cycle test was defined as L2 (hereinafter simply referred to as battery thickness L2). From these thicknesses, the battery thickness increase represented by the following equation (2) was calculated.

$$\text{Battery thickness increase} = \text{Battery thickness } L2 - \text{Battery thickness } L1 \quad (2)$$

TABLE 1

| | Positive electrode | | | | | Charge-discharge cycle performance | | |
|---|---|---|---|---|---|---|---|---|
| Battery | Lithium-transition metal composite oxide | Adhered substance | Amount of adhered substance in terms of element (mass %) | Heat-treatment temperature (° C.) | Negative electrode active material | Charge-discharge cycle test temperature (° C.) | Cycle life (times) | Battery thickness increase (mm) |
| A1 | LiCoO$_2$ | Erbium hydroxide | 0.07 | 120 | Silicon | 25 | 490 | 0.47 |

TABLE 1-continued

| Battery | Positive electrode | | | | Negative electrode active material | Charge-discharge cycle test temperature (° C.) | Charge-discharge cycle performance | |
|---|---|---|---|---|---|---|---|---|
| | Lithium-transition metal composite oxide | Adhered substance | Amount of adhered substance in terms of element (mass %) | Heat-treatment temperature (° C.) | | | Cycle life (times) | Battery thickness increase (mm) |
| A2 | | Erbium oxyhydroxide | | 300 | | | 490 | 0.47 |
| Z1 | | Zirconium hydroxide | | 120 | | | 480 | 0.51 |
| Z2 | | None | — | — | | | 450 | 0.50 |
| A1 | | Erbium hydroxide | 0.07 | 120 | | 45 | 300 | 1.20 |
| A2 | | Erbium oxyhydroxide | | 300 | | | 300 | 1.22 |
| Z1 | | Zirconium hydroxide | | 120 | | | 240 | 2.05 |
| Z2 | | None | — | — | | | 150 | 2.50 |

The results in Table 1 clearly indicate that Battery A1 of the invention, in which erbium hydroxide was adhered to the surface of the lithium cobalt oxide particles (i.e., the lithium-transition metal composite oxide particles), and Battery A2 of the invention, in which erbium oxyhydroxide was adhered to the surface of the lithium cobalt oxide particles, exhibited longer cycle life and less battery thickness increase after the charge-discharge cycle test than Comparative Battery Z1, in which zirconium hydroxide was adhered to the surface of the lithium cobalt oxide particles, and Comparative Battery Z2, in which no substance was adhered to the surface of the lithium cobalt oxide particles. In addition, this advantageous effect was especially noticeable when the temperature in the charge-discharge cycle test was high, at 45° C.

The reason is as follows. In Batteries A1 and A2 of the invention, the particles of erbium hydroxide or erbium oxyhydroxide are adhered to the surface of the lithium cobalt oxide particles. This serves to significantly inhibit the reductive decomposition product of the non-aqueous electrolyte, which is formed during charge and discharge on the highly active newly exposed surface formed in the surface of the silicon negative electrode active material, from undergoing oxidative decomposition on the lithium cobalt oxide surface, even when the reductive decomposition product of the non-aqueous electrolyte diffuses and migrates to the positive electrode and comes into contact with the lithium cobalt oxide. Accordingly, it is possible to prevent the degradation in the charge-discharge performance resulting from the deposition of the oxidative decomposition product, which can cause an increase of the charge-discharge reaction resistance at the interface between the surface of the positive electrode active material particles and the electrolyte solution, and to inhibit the battery thickness increase resulting from the generation of gas, which is a kind of the oxidative decomposition product. It should be noted that this further oxidative decomposition reaction of the reductive decomposition product of the non-aqueous electrolyte on the positive electrode is promoted at a high temperature. Therefore, the advantageous effects obtained by causing the particles of erbium hydroxide and the like to adhere to the surface of the lithium cobalt oxide particles were more significant when the temperature in the charge-discharge cycle test was 45° C. than when the temperature was 25° C.

In contrast, in Comparative Battery Z1, what are adhered to the surface of the lithium cobalt oxide particles are particles of zirconium hydroxide (i.e., not the particles of a rare earth hydroxide). Therefore, the effect of inhibiting the reductive decomposition product of the non-aqueous electrolyte from undergoing a further oxidative decomposition reaction on the positive electrode is less than the particles of erbium hydroxide, which are particles of a rare earth hydroxide. Also, in Comparative Battery Z2, no substance was adhered to the surface of the lithium-transition metal oxide particles, and therefore, no effect of inhibiting the oxidative decomposition reaction was obtained.

Second Group of Examples

Example

Preparation of Positive Electrode

First, LiOH and a composite hydroxide containing nickel as the main component of the metal elements [$Ni_{0.80}Co_{0.17}Al_{0.03}(OH)_2$] were mixed in an Ishikawa-type Raikai mortar so that the mole ratio of Li to the whole of the transition metals became 1.05:1. Thereafter, the mixture was sintered at 720° C. for 20 hours in an oxygen atmosphere and thereafter pulverized, to thus obtain powder of a lithium-transition metal composite oxide represented as $Li_{1.05}Ni_{0.80}Co_{0.17}Al_{0.03}O_2$ (average particle size 15 μm). Next, erbium oxyhydroxide was adhered to the surface of the lithium-transition metal composite oxide in the same manner as described in Example 2 in the First Group of Examples.

Next, using the powder of the positive electrode active material in which erbium oxyhydroxide was adhered to the surface, a positive electrode mixture slurry was prepared in the same manner as described in Example 2 in the First Group of Examples above. Thereafter, the resultant positive electrode mixture slurry was applied onto both sides of a positive electrode current collector made of an aluminum foil (thickness 15 μm, length 339 mm, width 50 mm) so that the length of the applied area was 277 mm on one side and 208 mm on the other side and the width of the applied area was 50 mm on both sides. Thereafter, the positive electrode current collector coated with the positive electrode mixture slurry was dried and pressure-rolled, to thus prepare a positive electrode. The amount of the positive electrode active material layer and the thickness of the positive electrode were 37 mg/cm$^2$ and 104 μm, respectively, measured at the portion where the active material layers were formed on both sides. In addition, an aluminum plate serving as a positive electrode current collector tab was connected to an end portion of the positive electrode on which no positive electrode active material layer was formed.

Preparation of Negative Electrode

A negative electrode was prepared in the same manner as described in Example 2 in the First Group of Examples above, except that the electrode was cut out into a rectangular shape with a length of 317 mm and a width of 52 mm.

Preparation of Non-Aqueous Electrolyte Solution

Lithium hexafluorophosphate (LiPF$_6$) was dissolved at a concentration of 1.0 mol/L in a mixed solvent of 20:80 volume ratio of fluoroethylene carbonate (FEC) and methyl ethyl carbonate (MEC). Thereafter, 0.4 mass % of carbon dioxide gas was dissolved into the resultant solution, to thus prepare a non-aqueous electrolyte solution.

Preparation of Electrode Assembly

A flat-type electrode assembly was prepared in the same manner as described in Example 2 in the First Group of Examples, except that the length of the microporous polyethylene film was set at 380 mm.

Preparation of Battery

A flat-type lithium secondary battery was fabricated in the same manner as described in Example 2 of the First Group of Examples above. The design capacity of the secondary battery is 800 mAh when charged to 4.20 V.

The battery fabricated in this manner is hereinafter referred to as Battery A3 of the invention.

Comparative Example

A battery was fabricated in the same manner as described in the example above, except that a positive electrode active material in which no particle of erbium oxyhydroxide was adhered to the surface of the lithium-transition metal composite oxide represented as Li$_{1.05}$Ni$_{0.80}$Co$_{0.17}$Al$_{0.03}$O$_2$ was used as the positive electrode active material.

The battery fabricated in this manner is hereinafter referred to as Comparative Battery Z3.

Experiment

Battery A3 of the invention and Comparative Battery Z3 were charged and discharged under the following conditions (subjected to an initial charge-discharge process and thereafter subjected to a high-temperature continuous charging) to determine the battery thickness increase before and after the high-temperature continuous charging. The results are shown in Table 2 below.

Initial Charge-Discharge Conditions
Temperature
25° C. (room temperature)
Charge Conditions
Each of the batteries was charged at a constant current of 800 mA to a battery voltage of 4.20 V and was thereafter charged at a constant voltage of 4.20 V until the current value reached 40 mA.
Discharge Conditions
Each of the lithium secondary batteries subjected to the initial charging under the just-described conditions was rested for 5 minutes and thereafter discharged at a constant current of 800 mA until the battery voltage reached 2.50 V.
Charge Conditions During High-Temperature Continuous Charging
Temperature
60° C. (Each of the batteries was placed in a thermostatic chamber.)
Charge Conditions
Each of the batteries was charged with a constant current of 800 mA until the battery voltage reached 4.20 V. Thereafter, each of the batteries was charged for 50 hours while keeping the voltage at 4.20 V.

The battery thickness of each of the batteries was measured before and after the high-temperature continuous charging to determine the thickness increase for each of the batteries. The measurement was conducted in the same method as described in the foregoing experiment in the First Group of Examples.

TABLE 2

| Battery | Positive electrode Lithium-transition metal composite oxide | Adhered substance | Amount of adhered substance in terms of element (mass %) | Heat-treatment temperature (° C.) | Negative electrode active material | Atmosphere and duration of high-temperature continuous charging | Battery thickness increase (mm) |
|---|---|---|---|---|---|---|---|
| A3 | Li$_{1.05}$Ni$_{0.80}$Co$_{0.17}$Al$_{0.03}$O$_2$ | Erbium oxyhydroxide | 0.07 | 300 | Silicon | 60° C., 50 hours | 9.06 |
| Z3 | | None | — | — | | | 11.04 |

Table 2 clearly demonstrates that Battery A3 of the invention, in which erbium oxyhydroxide was adhered to the surface of the lithium-transition metal composite oxide particles, showed less battery thickness increase than Comparative Battery Z3, in which no substance was adhered to the surface of the lithium-transition metal composite oxide particles. The reason is as follows. As described in the reason stated in the experiment of the First Group of Examples, Battery A3 of the invention can also significantly inhibit the reductive decomposition product of the non-aqueous electrolyte, which is formed during charge and discharge on the highly active newly exposed surface in the negative electrode active material, from undergoing oxidative decomposition on the lithium cobalt oxide surface when the reductive decomposition product of the non-aqueous electrolyte diffuses and migrates to the positive electrode and comes into contact with the lithium-transition metal composite oxide, and thereby prevent the generation of gas, which is a kind of the oxidative decomposition product. In contrast, in Comparative Battery Z3, no substance is adhered to the surface of the positive electrode active material particles. Therefore, no effect of inhibiting the oxidative decomposition reaction is obtained, and a large amount of gas is formed. Hence, it will be appreciated that other lithium-transition metal composite oxides than the lithium cobalt oxide, such as the one containing transition metals such as nickel and aluminum, may also be used for the present invention.

However, it is observed that the absolute magnitude of the battery swelling is greater even in Battery A3 of the invention, not only in Comparative Battery Z3, than are those observed in the results of the experiment in the First Group of Examples. The reason is believed to be that, since the foregoing experiment conditions were extremely severe when the electrolyte solution contains FEC and the negative electrode employs silicon, the FEC in the electrolyte solution decomposed on the negative electrode surface, resulting in gas generation.

However, Battery A3 of the invention showed less swelling than Comparative Battery Z3 even under the severe conditions because it significantly inhibits the oxidative decomposition reaction of the reductive decomposition product on the surface of the positive electrode active material, as described above. In addition, it was demonstrated, as will be described later in the Second Group of Reference Examples, that the effect of inhibiting the oxidative decomposition reaction on the positive electrode surface was similarly obtained even when the FEC in the electrolyte solution did not decompose on the negative electrode surface or cause gas generation, unlike Battery A3 of the invention and Comparative Battery Z3.

Other Embodiments (1) The compound that is to be adhered to the surface of the lithium-transition metal composite oxide particles is not limited to erbium hydroxide and erbium oxyhydroxide, but the same advantageous effects can be obtained even when using other hydroxides or oxyhydroxides of rare earth elements, such as ytterbium, terbium, dysprosium, holmium, thulium, lutetium, neodymium, samarium, praseodymium, europium, gadolinium, lanthanum, and yttrium. The method of preparing the positive electrode active material is substantially the same as described in Example 1 or 2 above. (For example, the same method as described Example 1 can be used to obtain a hydroxide of yttrium, except that a solution of yttrium salt, in place of the erbium salt, should be added to the solution in which particles of the lithium-transition metal composite oxide are dispersed.) An oxyhydroxide of a rare earth element can be obtained by changing the temperature of the heat treatment, as will be described later, in addition to changing the salt as just described.

Next, the temperature of the heat treatment for the positive electrode active material on which a rare earth hydroxide is deposited will be discussed.

Erbium Hydroxide

In the case of erbium hydroxide, the temperature at which erbium hydroxide decomposes and changes into erbium oxyhydroxide is about 230° C., and the temperature at which the resulting erbium oxyhydroxide further decomposes and changes into erbium oxide is about 440° C. When the temperature of heat-treating the positive electrode active material particles on which erbium hydroxide is deposited reaches 440° C. or higher, the erbium hydroxide changes into erbium oxide and at the same time erbium diffuses into the lithium-transition metal composite oxide particle. When this happens, it is difficult to inhibit the reaction between the positive electrode active material and the non-aqueous electrolyte sufficiently, and the charge-discharge performance of the positive electrode active material deteriorates significantly.

For this reason, when heat-treating the positive electrode active material on which erbium hydroxide is deposited, it is preferable that the temperature of the heat treatment be restricted to less than 440° C.

Ytterbium Hydroxide

In the case of ytterbium hydroxide, a thermogravimetric analysis was conducted by elevating the temperature of the heat treatment in increments of 5° C. per minute. As a result, inflection points of weight change were observed at about 230° C. and about 400° C., and the weight change became small and stable at about 500° C. This is believed to indicate that the ytterbium hydroxide started to decompose and change into ytterbium oxyhydroxide at a temperature of about 230° C., then the ytterbium oxyhydroxide further decomposed and changed into ytterbium oxide at a temperature of about 400° C., and the ytterbium hydroxide changed into ytterbium oxide at a temperature of about 500° C.

This means that when the temperature of heat-treating the positive electrode active material on which ytterbium hydroxide is deposited reaches 400° C. or higher, the ytterbium oxyhydroxide starts to change into ytterbium oxide, and when the temperature of the heat treatment becomes 500° C. or higher, the ytterbium hydroxide changes into ytterbium oxide, and at the same time, ytterbium diffuses into the lithium-transition metal composite oxide particle. When this occurs, it is difficult to inhibit the reaction between the positive electrode active material and the non-aqueous electrolyte sufficiently, and the charge-discharge performance of the positive electrode active material deteriorates significantly.

For this reason, when heat-treating the positive electrode active material on which ytterbium hydroxide is deposited, it is preferable that the temperature of the heat treatment be restricted to less than 500° C., more preferably less than 400° C.

Terbium Hydroxide

In the case of terbium hydroxide, the temperature at which terbium hydroxide decomposes and changes into terbium oxyhydroxide is about 295° C., and the temperature at which the resulting terbium oxyhydroxide further decomposes and changes into terbium oxide is about 395° C.

When the temperature of heat-treating the positive electrode active material on which terbium hydroxide is deposited reaches 395° C. or higher, the terbium hydroxide changes into terbium oxide, and at the same time, terbium diffuses into the lithium-transition metal composite oxide particle. When this occurs, it is difficult to inhibit the reaction between the positive electrode active material and the non-aqueous electrolyte sufficiently, and the charge-discharge performance of the positive electrode active material deteriorates significantly.

For this reason, when heat-treating the positive electrode active material on which terbium hydroxide is deposited, it is preferable that the temperature of the heat treatment be restricted to less than 395° C.

Dysprosium Hydroxide

In the case of dysprosium hydroxide, the temperature at which dysprosium hydroxide decomposes and changes into dysprosium oxyhydroxide is about 275° C., and the temperature at which the resulting dysprosium oxyhydroxide further decomposes and changes into dysprosium oxide is about 450° C.

When the temperature of heat-treating the positive electrode active material on which dysprosium hydroxide is deposited reaches 450° C. or higher, the dysprosium hydroxide changes into dysprosium oxide, and at the same time, dysprosium diffuses into the lithium-transition metal composite oxide particle. When this occurs, it is difficult to inhibit the reaction between the positive electrode active material and the non-aqueous electrolyte sufficiently, and the charge-discharge performance of the positive electrode active material deteriorates significantly.

For this reason, when heat-treating the positive electrode active material on which dysprosium hydroxide is deposited, it is preferable that the temperature of the heat treatment be restricted to less than 450° C.

Holmium Hydroxide

In the case of holmium hydroxide, the temperature at which holmium hydroxide decomposes and changes into holmium oxyhydroxide is about 265° C., and the temperature at which the resulting holmium oxyhydroxide further decomposes and changes into holmium oxide is about 445° C.

When the temperature of heat-treating the positive electrode active material on which holmium hydroxide is deposited reaches 445° C. or higher, the holmium hydroxide changes into holmium oxide, and at the same time, holmium diffuses into the lithium-transition metal composite oxide particle. When this occurs, it is difficult to inhibit the reaction between the positive electrode active material and the non-aqueous electrolyte sufficiently, and the charge-discharge performance of the positive electrode active material deteriorates significantly.

For this reason, when heat-treating the positive electrode active material on which holmium hydroxide is deposited, it is preferable that the temperature of the heat treatment be restricted to less than 445° C.

Thulium Hydroxide

In the case of thulium hydroxide, the temperature at which thulium hydroxide decomposes and changes into thulium oxyhydroxide is about 250° C., and the temperature at which the resulting thulium oxyhydroxide further decomposes and changes into thulium oxide is about 405° C.

When the temperature of heat-treating the positive electrode active material on which thulium hydroxide is deposited reaches 405° C. or higher, the thulium hydroxide changes into thulium oxide and at the same time, thulium diffuses into the lithium-transition metal composite oxide particle. When this occurs, it is difficult to inhibit the reaction between the positive electrode active material and the non-aqueous electrolyte sufficiently, and the charge-discharge performance of the positive electrode active material deteriorates significantly.

For this reason, when heat-treating the positive electrode active material on which thulium hydroxide is deposited, it is preferable that the temperature of the heat treatment be restricted to less than 405° C.

Lutetium Hydroxide

In the case of lutetium hydroxide, it was found as a result of a thermogravimetric analysis that the temperature at which lutetium hydroxide decomposes and changes into lutetium oxyhydroxide was about 280° C., and the temperature at which the resulting lutetium oxyhydroxide further decomposes and changes into lutetium oxide was about 405° C.

When the temperature of heat-treating the positive electrode active material on which lutetium hydroxide is deposited reaches 405° C. or higher, the lutetium hydroxide changes into lutetium oxide, and at the same time, lutetium diffuses into the lithium-transition metal composite oxide particle. When this occurs, it is difficult to inhibit the reaction between the positive electrode active material and the non-aqueous electrolyte sufficiently, and the charge-discharge performance of the positive electrode active material deteriorates significantly.

For this reason, when heat-treating the positive electrode active material on which lutetium hydroxide is deposited, it is preferable that the temperature of the heat treatment be restricted to less than 405° C.

Neodymium Hydroxide

In the case of neodymium hydroxide, neodymium hydroxide changes into neodymium oxyhydroxide at a temperature of from 335° C. to 350° C., and changes into neodymium oxide at a temperature of from 440° C. to 485° C.

When the temperature of heat-treating the positive electrode active material in which neodymium hydroxide is deposited on the surface reaches 440° C. or higher, the neodymium hydroxide changes into neodymium oxide, and at the same time, neodymium may diffuse into the lithium-transition metal composite oxide particle. When this occurs, the performance of the positive electrode active material deteriorates and the battery performance such as the charge-discharge efficiency accordingly deteriorates, because the neodymium oxide cannot provide the same advantageous effect as can the neodymium hydroxide and the neodymium oxyhydroxide.

For this reason, when heat-treating the positive electrode active material in which neodymium hydroxide is deposited on the surface, it is preferable that the temperature of the heat treatment be restricted to less than 440° C.

Samarium Hydroxide

In the case of samarium hydroxide, samarium hydroxide changes into samarium oxyhydroxide at a temperature of from 290° C. to 330° C., and changes into samarium oxide at a temperature of from 430° C. to 480° C.

When the temperature of heat-treating the positive electrode active material in which samarium hydroxide is deposited on the surface reaches 430° C. or higher, the samarium hydroxide changes into samarium oxide, and at the same time, samarium may diffuse into the lithium-transition metal composite oxide particle. When this occurs, the performance of the positive electrode active material deteriorates and the battery performance such as the charge-discharge efficiency accordingly deteriorates, because the samarium oxide cannot yield the same advantageous effect as can the samarium hydroxide and the samarium oxyhydroxide.

For this reason, when heat-treating the positive electrode active material in which samarium hydroxide is deposited on the surface, it is preferable that the temperature of the heat treatment be restricted to less than 430° C.

Praseodymium Hydroxide

In the case of praseodymium hydroxide, it is preferable that the heat treatment be conducted after depositing praseodymium hydroxide on the surface of the positive electrode active material particles, with an additional purpose of removing the water content. Here, when the temperature of heat-treating the positive electrode active material in which praseodymium hydroxide is deposited on the surface reaches about 310° C. or higher, the praseodymium hydroxide changes into praseodymium oxide, which cannot provide the same advantageous effect as can the praseodymium hydroxide.

For this reason, when heat-treating the positive electrode active material in which praseodymium hydroxide is deposited on the surface, it is preferable that the temperature of the heat treatment be restricted to less than 310° C.

Europium Hydroxide

In the case of europium hydroxide, europium hydroxide changes into europium oxyhydroxide at about 305° C., and changes into europium oxide at about 470° C.

When the temperature of heat-treating the positive electrode active material in which europium hydroxide is deposited on the surface reaches 470° C. or higher, the europium hydroxide changes into europium oxide, and at the same time, europium diffuses into the lithium-transition metal composite oxide particle. When this occurs, the performance of the positive electrode active material deteriorates and the battery performance such as the charge-discharge efficiency accordingly deteriorates, because the europium oxide cannot provide the same advantageous effect as can the europium hydroxide and the europium oxyhydroxide.

For this reason, when heat-treating the positive electrode active material in which europium hydroxide is deposited on the surface, it is preferable that the temperature of the heat treatment be restricted to less than 470° C.

Gadolinium Hydroxide

In the case of gadolinium hydroxide, gadolinium hydroxide changes into gadolinium oxyhydroxide at a temperature of from 218° C. to 270° C., and changes into gadolinium oxide at a temperature of from 420° C. to 500° C.

When the temperature of heat-treating the positive electrode active material in which gadolinium hydroxide is deposited on the surface reaches 420° C. or higher, the gadolinium hydroxide changes into gadolinium oxide, and at the same time, gadolinium may diffuse into the lithium-transition metal composite oxide particle. When this occurs, the performance of the positive electrode active material deteriorates and the battery performance such as the charge-discharge efficiency accordingly deteriorates, because the gadolinium oxide cannot provide the same advantageous effect as can the gadolinium hydroxide and the gadolinium oxyhydroxide.

For this reason, when heat-treating the positive electrode active material in which gadolinium hydroxide is deposited on the surface, it is preferable that the temperature of the heat treatment be restricted to less than 420° C.

Lanthanum Hydroxide

In the case of lanthanum hydroxide, lanthanum hydroxide changes into lanthanum oxyhydroxide at a temperature of from 310° C. to 365° C., and changes into lanthanum oxide at a temperature of from 460° C. to 510° C.

When the temperature of heat-treating the positive electrode active material in which lanthanum hydroxide is deposited on the surface reaches 600° C. or higher, the lanthanum hydroxide changes into lanthanum oxide, which cannot provide the same advantageous effect as can the lanthanum hydroxide and the lanthanum oxyhydroxide, and at the same time, lanthanum diffuses into the lithium-transition metal composite oxide particle, deteriorating the performance of the positive electrode and accordingly deteriorating the battery performance such as the charge-discharge efficiency.

For this reason, when heat-treating the positive electrode active material in which lanthanum hydroxide is deposited on the surface, it is preferable that the temperature of the heat treatment be restricted to less than 460° C.

Yttrium Hydroxide

In the case of yttrium hydroxide, yttrium hydroxide changes into yttrium oxyhydroxide at about 260° C., and changes into yttrium oxide at about 450° C. When the temperature of heat-treating the positive electrode active material in which yttrium hydroxide is deposited on the surface reaches 450° C. or higher, the yttrium hydroxide changes into yttrium oxide, which cannot provide the same advantageous effect as can the yttrium hydroxide and the yttrium oxyhydroxide, and at the same time, yttrium diffuses into the lithium-transition metal composite oxide particle, deteriorating the performance of the positive electrode and accordingly deteriorating the battery performance such as the charge-discharge efficiency.

For this reason, when heat-treating the positive electrode active material in which yttrium hydroxide is deposited on the surface, it is preferable that the temperature of the heat treatment be restricted to less than 450° C.

Here, the temperatures at which the rare earth hydroxides change into the respective rare earth oxyhydroxides and the temperatures at which they change into the respective rare earth oxides are summarized in Table 3 below for purposes of clarity of understanding.

TABLE 3

| Rare earth hydroxide | Temperature at which the hydroxide changes into an oxyhydroxide | Temperature at which the hydroxide changes into an oxide |
| --- | --- | --- |
| Erbium hydroxide | Approx. 230° C. | Approx. 440° C. |
| Ytterbium hydroxide | Approx. 230° C. | Approx. 400° C. |
| Terbium hydroxide | Approx. 295° C. | Approx. 395° C. |
| Dysprosium hydroxide | Approx. 275° C. | Approx. 450° C. |
| Holmium hydroxide | Approx. 265° C. | Approx. 445° C. |
| Thulium hydroxide | Approx. 250° C. | Approx. 405° C. |
| Lutetium hydroxide | Approx. 280° C. | Approx. 405° C. |
| Neodymium hydroxide | 335-350° C. | 440-485° C. |
| Samarium hydroxide | 290-330° C. | 430-480° C. |
| Praseodymium hydroxide | — | Approx. 310° C. |
| Europium hydroxide | Approx. 305° C. | Approx. 470° C. |
| Gadolinium hydroxide | 218-270° C. | 420-500° C. |
| Lanthanum hydroxide | 310-365° C. | 460-510° C. |
| Yttrium hydroxide | Approx. 260° C. | Approx. 450° C. |

It should be noted that scandium hydroxide and scandium oxyhydroxide may be used other than the above-listed compounds.

(2) The amount of erbium hydroxide and erbium oxyhydroxide adhering to the surface of the lithium-transition metal composite oxide is not limited to the amount described above (0.07 mass % in terms of elemental erbium based on the mass of the lithium cobalt oxide), but should preferably be within the range of from 0.005 mass % to 0.5 mass %, more preferably from 0.01 mass % to 0.3 mass %, in terms of elemental erbium based on the mass of the lithium cobalt oxide. If the amount of the adhering erbium hydroxide and erbium oxyhydroxide is less than 0.005 mass %, the effect of inhibiting the reductive decomposition product of the non-aqueous electrolyte from undergoing the oxidative decomposition on the positive electrode cannot be obtained sufficiently because the amount of erbium hydroxide and erbium oxyhydroxide is too small. On the other hand, if amount of the adhering erbium hydroxide and erbium oxyhydroxide exceeds 0.5 mass %, the electron conductivity between the positive electrode active material particles becomes poor because the amount of the particles that do not contribute to the charge-discharge reaction is too large, and accordingly, the charge-discharge performance becomes poor.

The foregoing also applies to the above-mentioned compounds other than the erbium compounds. Likewise, the following sections (3) to (5) also applies to the above-mentioned compounds other than the erbium compounds.

(3) The pH of the solution in which the lithium-transition metal composite oxide particles are dispersed is not limited to the above-described value (pH=9), but needs to be equal to or greater than 6. The reason is that, if the pH is less than 6, the erbium salt (erbium nitrate pentahydrate) does not change into erbium hydroxide. In particular, in order to deposit the hydroxide in a very small size on the surface of the lithium-transition metal composite oxide particles in an appropriately dispersed form, it is preferable that the pH of the solution in which lithium-transition metal composite oxide is dispersed be restricted to the range of from 6 to 13, more preferably from 7 to 10.

(4) The method for causing the erbium hydroxide and the like to be adhered to the lithium-transition metal composite oxide is not limited to the above-described wet method, but may be a dry method (a method of causing erbium hydroxide to be adhered to the surface of the lithium-transition metal composite oxide by physically mixing together erbium hydroxide and the lithium-transition metal composite oxide in solid state). However, the wet method enables microparticles of erbium hydroxide to adhere to the surface of the lithium-transition metal composite oxide in a more uniformly dispersed form than the dry method, and therefore, it also enables the erbium oxyhydroxide particles produced from the erbium hydroxide particles by the subsequent heat treatment to adhere in a more uniformly dispersed form in the form of microparticles. Thus, the wet method allows the effect of inhibiting the oxidative decomposition reaction of the non-aqueous electrolyte and the reductive decomposition product thereof to exhibit more uniformly on the surface of the lithium-transition metal composite oxide particles than the dry method, so it is preferable to use the wet method.

(5) The advantageous effects of the present invention are especially significant in the system of the non-aqueous electrolyte that contains fluoroethylene carbonate as a solvent component. The reason is as follows.

In a battery using silicon as the negative electrode active material, fluoroethylene carbonate is often used as a solvent component of the non-aqueous electrolyte in order to prevent the deterioration on the silicon particle surface resulting from the fractures caused by a large volumetric change of silicon during charge and discharge. However, the fluoroethylene carbonate contains fluorine atoms, which show high electron-withdrawing capability, so it tends to undergo reductive decomposition easily. The reductive decomposition reaction of the fluoroethylene carbonate occurs extensively on the surface of the silicon negative electrode active material, which has high reducing power. Although the lithium fluoride produced by this reductive decomposition reaction forms on the silicon negative electrode surface and exhibits the effect of inhibiting deterioration of the silicon negative electrode, part of the rest of the reductive decomposition product diffuses and migrates to the positive electrode and undergoes further oxidative decomposition on the positive electrode active material surface. This oxidative decomposition product, like the oxidative decomposition products formed at the positive electrode that originate from the reductive decomposition products of other non-aqueous electrolyte components, causes the charge-discharge reaction resistance to increase, by depositing on the surface of the lithium-transition metal composite oxide particles, and the battery thickness to increase, due to the generation of gas, which is part of the oxidative decomposition product.

However, because the particles of at least one rare earth compound selected from erbium hydroxide and erbium oxyhydroxide are adhered to the surface of the particles of the lithium-transition metal composite oxide (lithium cobalt oxide) as described in the foregoing example, the oxidative decomposition reaction of the reductive decomposition product of the fluoroethylene carbonate on the surface of the lithium-transition metal composite oxide particles is inhibited, as well as the reductive decomposition products of other non-aqueous electrolyte components. As a result, it becomes possible to effectively obtain the beneficial effects achieved by the addition of fluoroethylene carbonate, such as the effect of inhibiting the silicon negative electrode active material from deterioration, while preventing the adverse effects caused by the addition of fluoroethylene carbonate, such as degradation in the charge-discharge performance resulting from the oxidative decomposition product formed at the positive electrode. This will be clearly understood from the foregoing Second Group of Examples.

First Group of Reference Examples

Purpose of the Following Experiment

As already described above, the substance to be adhered to the surface of the positive electrode active material particles is not limited to erbium hydroxide and erbium oxyhydroxide described above but may be hydroxides and oxyhydroxides of rare earth elements other than erbium. In order to demonstrate this, the following experiment was carried out.

Here, in the present reference example, batteries were fabricated using ytterbium hydroxide, samarium oxyhydroxide, and neodymium oxyhydroxide, in addition to erbium oxyhydroxide as used in the foregoing, as the hydroxide or oxyhydroxide of the rare earth element to be adhered to the surface of the positive electrode active material particles, and a charge-discharge cycle performance test was conducted using the fabricated batteries. It should be noted that that the following reference examples use a carbon material as the negative electrode active material, and this is a significant difference from the foregoing examples, which use silicon as the negative electrode active material. (The types of the positive electrode active material particles and the non-aqueous electrolyte solution are also slightly different from those in the foregoing examples, but these differences not essential.)

When a carbon material is used as the negative electrode active material, the serious problem of the oxidative decomposition reaction on the positive electrode surface, caused by the reductive decomposition product of the negative electrode that diffuses and migrates to the positive electrode side, does not arise. However, when the battery is charged to a high voltage, the problem associated with the reaction of the non-aqueous electrolyte solution taking place at the surface of the positive electrode active material arises, because transition metals having catalytic property (such as Co, Fe, Ni, and Mn) exist. That is, it is necessary to inhibit some kind of reaction on the positive electrode surface not only in the case of using silicon, but also in the case of using a carbon material, as the negative electrode active material. For this purpose, the hydroxides and oxyhydroxides of the rare earth elements are adhered uniformly to the positive electrode active material surface, as shown in the following Reference Batteries. Taking this into consideration, the advantageous effects of the present invention can be exhibited when applying the configurations of the positive electrodes in the following Reference Batteries, which can inhibit the reactions at the surface of the positive electrode active material, to the present invention (i.e., not only when using erbium hydroxide and erbium oxyhydroxide as in the foregoing examples but also when ytterbium hydroxide and the like are uniformly adhered to the surface of the lithium-transition metal composite oxide particles). Under this assumption, an experiment was conducted as follows.

Reference Example 1

A battery was fabricated in the same manner as described in Example 1 of the First Group of Examples, except that the positive electrode, the negative electrode, and the electrolyte solution were prepared in the following manner. The design capacity of the secondary battery is 780 mAh when charged to 4.40 V.

The battery fabricated in this manner is hereinafter referred to as Reference Battery B1.

Preparation of Positive Electrode
(1) Erbium Hydroxide Coating by a Wet Method

A lithium cobalt oxide in which each of Mg and Al is contained in the form of solid solution in an amount of 0.5 mol % was used as the lithium-transition metal composite oxide particles. 1,000 g of particles of the just-described lithium cobalt oxide was put in 3 liters of pure water, and while agitating the resultant solution, an erbium nitrate aqueous solution in which 5.79 g of erbium nitrate pentahydrate was dissolved in 200 mL of pure water was added thereto. In this process, 10 mass % of aqueous sodium hydroxide solution was added appropriately to control the pH of this solution to 9, so that erbium hydroxide was adhered to the surface of the lithium cobalt oxide particles. Then, this was vacuum-filtrated to filter the resultant substance, and the resultant substance was dried at 120° C., to obtain lithium cobalt oxide particles in which erbium hydroxide was adhered to the surface.

Next, the lithium cobalt oxide particles in which erbium hydroxide was adhered to the surface was heat-treated in the air at 300° C. for 5 hours. Thereby, a positive electrode active material was obtained, in which particles of an erbium compound are adhered to the surface of the lithium cobalt oxide particles (the erbium compound is mainly composed of erbium oxyhydroxide but erbium hydroxide, but some of the erbium hydroxide may remain without changing into erbium oxyhydroxide).

Here, the amount of the adhering erbium compound was 0.22 mass % in terms of elemental erbium based on the mass of the lithium cobalt oxide. In addition, the resultant positive electrode active material was observed by SEM. As a result, it was found that most of the particles of the erbium compound adhered to the surface of the lithium cobalt oxide particles had a particle size of 100 nm or less, and the particles of the erbium compound were adhered to the surface of the lithium cobalt oxide particles in a dispersed form.

Next, this positive electrode active material, acetylene black as a conductive agent, and an N-methyl-2-pyrrolidone solution in which polyvinylidene fluoride as a binder agent was dissolved were mixed together and agitated using a mixer (Combimix mixer made by Tokushu Kika Kogyo Co., Ltd.), to obtain a positive electrode mixture slurry. The mass ratio of the positive electrode active material, the conductive agent, and the binder agent was set at 95:2.5:2.5. Then, the resultant positive electrode mixture slurry was applied uniformly onto both sides of a positive electrode current collector made of an aluminum foil. The resultant material was then dried and pressure-rolled by pressure rollers, to obtain a positive electrode in which positive electrode active material layers were formed on both sides of the positive electrode current collector. The filling density of the positive electrode active material in this positive electrode was 3.60 g/cm$^3$.

Preparation of Negative Electrode

Artificial graphite as a negative electrode active material, CMC (carboxymethylcellulose sodium), and SBR (styrene-butadiene rubber) as a binder agent were mixed together at a mass ratio of 98:1:1 in an aqueous solution, to prepare a negative electrode mixture slurry. Then, the resultant negative electrode mixture slurry was applied uniformly onto both sides of a negative electrode current collector made of a copper foil. The resultant material was then dried and pressure-rolled by pressure rollers, to obtain a negative electrode in which negative electrode active material layers were formed on both sides of the negative electrode current collector. The filling density of the negative electrode active material in this negative electrode was 1.75 g/cm$^3$.

Preparation of Non-Aqueous Electrolyte Solution

LiPF$_6$ as a solute was dissolved at a concentration of 1.0 mol/L in a mixed solvent of 3:7 volume ratio of ethylene carbonate and diethyl carbonate, which are non-aqueous solvents, to prepare a non-aqueous electrolyte solution.

Reference Example 2

A battery was fabricated in the same manner as described in Reference Example 1 above, except that 5.24 g of ytterbium nitrate trihydrate was used in place of erbium nitrate. In the positive electrode active material of this battery, particles of an ytterbium compound is adhered to the surface of the lithium cobalt oxide particles (the ytterbium compound is mainly composed of ytterbium oxyhydroxide, but some of the ytterbium hydroxide may remain without changing into ytterbium oxyhydroxide). The amount of the adhering ytterbium compound was 0.22 mass % in terms of elemental ytterbium (Yb) based on the mass of the lithium cobalt oxide.

The battery fabricated in this manner is hereinafter referred to as Reference Battery B2.

Reference Example 3

A battery was fabricated in the same manner as described in Reference Example 1 above, except that a lithium cobalt oxide in which 0.5 mol % of Mg, 0.5 mol % of Al, and 0.1 mol % of Zr were contained in the form of solid solution was used as the lithium-transition metal composite oxide, and that 5.35 g of samarium nitrate hexahydrate was used in place of the erbium nitrate pentahydrate, and that the temperature of the heat treatment was set at 400° C. In the positive electrode active material of this battery, particles of a samarium compound is adhered to the surface of the lithium cobalt oxide particles (the samarium compound is mainly composed of samarium oxyhydroxide, but some of the samarium hydroxide may remain without changing into samarium oxyhydroxide). The amount of the adhering samarium compound was 0.18 mass % in terms of elemental samarium (Sm) based on the mass of the lithium cobalt oxide.

The battery fabricated in this manner is hereinafter referred to as Reference Battery B3.

Reference Example 4

A battery was fabricated in the same manner as described in Reference Example 1 above, except that a lithium cobalt oxide in which 0.5 mol % of Mg, 0.5 mol % of Al, and 0.1 mol % of Zr were contained in the form of solid solution was used as the lithium-transition metal composite oxide, and that 5.47 g of neodymium nitrate hexahydrate was used in place of the erbium nitrate pentahydrate, and that the temperature of the heat treatment was set at 400° C. In the positive electrode active material of this battery, particles of a neodymium compound is adhered to the surface of the lithium cobalt oxide particles (the neodymium compound is mainly composed of neodymium oxyhydroxide, but some of the neodymium hydroxide may remain without changing into neodymium oxyhydroxide). The amount of the adhering neodymium compound was 0.18 mass % in terms of elemental neodymium (Nd) based on the mass of the lithium cobalt oxide.

The battery fabricated in this manner is hereinafter referred to as Reference Battery B4.

Comparative Reference Example 1

A battery was fabricated in the same manner as described in Reference Example 1 above, except that no erbium compound was adhered to the surface of the lithium cobalt oxide particles.

The battery fabricated in this manner is hereinafter referred to as Comparative Reference Battery Y1.

Comparative Reference Example 2

A battery was fabricated in the same manner as described in Reference Example 1 above, except that 30.9 g of aluminum nitrate nonahydrate was used in place of the erbium nitrate pentahydrate and that the temperature of the heat treatment was set at 120° C. In the positive electrode active material of this battery, particles of aluminum hydroxide are adhered to the surface of the lithium cobalt oxide particles. The amount of the adhering aluminum hydroxide was 0.22 mass % in terms of elemental aluminum (Al) based on the mass of the lithium cobalt oxide.

The battery fabricated in this manner is hereinafter referred to as Comparative Reference Battery Y2.

Comparative Reference Example 3

A battery was fabricated in the same manner as described in Reference Example 1 above, except that 30.9 g of aluminum nitrate nonahydrate was used in place of the erbium nitrate pentahydrate and that the temperature of the heat treatment was set at 500° C. In the positive electrode active material of this battery, particles of aluminum oxide are adhered to the surface of the lithium cobalt oxide particles. The amount of the adhering aluminum oxide was 0.22 mass % in terms of elemental aluminum (Al) based on the mass of the lithium cobalt oxide.

The battery fabricated in this manner is hereinafter referred to as Comparative Reference Battery Y3.

Comparative Reference Example 4

A battery was prepared in the same manner as described in Reference Example 1 above, except that the temperature of the heat treatment was set at 500° C. In the positive electrode active material of this battery, particles of erbium oxide are adhered to the surface of the lithium cobalt oxide particles. The amount of the adhering erbium oxide was 0.22 mass % in terms of elemental erbium (Er) based on the mass of the lithium cobalt oxide.

The battery fabricated in this manner is hereinafter referred to as Comparative Reference Battery Y4.

Comparative Reference Example 5

A battery was fabricated in the same manner as described in Reference Example 3 above, except that no samarium compound was adhered to the surface of the lithium cobalt oxide particles.

The battery fabricated in this manner is hereinafter referred to as Comparative Reference Battery Y5.

Experiment

Next, the above-described Reference Batteries B1 to B4 and Comparative Reference Batteries Y1 to Y5 were charged and discharged under the following conditions to determine the battery thickness increase and the capacity retention ratio after a high-temperature continuous charging test. The results are shown in Table 4 below.

Initial Charging and Discharging

Temperature

25° C. (room temperature)

Charge Conditions

Each of the batteries was charged at a constant current of 750 mA to a battery voltage of 4.40 V (4.50 V versus lithium metal) and was thereafter charged at a constant voltage of 4.40 V until the current value reached 37.5 mA.

Discharge Conditions

Each of the lithium secondary batteries having been charged under the just-described initial charging conditions was rested for 10 minutes, and thereafter discharged at a constant current of 750 mA until the battery voltage reached 2.75 V. The discharge capacity in this discharge was measured, and the discharge capacity obtained was defined as the initial discharge capacity $Q_3$.

Charge Conditions During High-Temperature Continuous Charging

Temperature

60° C. (Each of the batteries was placed in a thermostatic chamber.)

Charge Conditions

Each of the batteries was charged at a constant current of 750 mA until the battery voltage reached 4.40 V. Thereafter, each of the batteries was further charged while keeping the voltage at 4.40 V.

Charge Durations 3 days for Reference Batteries B1, B2 and Comparative Reference Batteries Y1 to Y4.

75 hours for Reference Batteries B3, B4, and Comparative Reference Battery Y5.

The battery thickness of each of the batteries was measured before and after the high-temperature continuous charging to determine the thickness increase for each of the batteries. The measurement was conducted in the same manner as described in the foregoing experiment in the First Group of Examples.

Discharge Conditions after High-Temperature Continuous Charging

Temperature

25° C. (room temperature)

Discharge Conditions

Each of the lithium secondary batteries having been charged under the just-described charging conditions was rested for 10 minutes, and thereafter discharged at a constant current of 750 mA until the battery voltage reached 2.75 V. The discharge capacity in this discharge was measured, and the discharge capacity obtained was defined as the discharge capacity $Q_4$ after high-temperature continuous charging test.

Then, the capacity retention ratio (%) after high-temperature continuous charging test, represented by the following equation (3), was obtained from the above initial discharge capacity $Q_3$ and the discharge capacity $Q_4$ after high-temperature continuous charging test.

$$\text{Capacity retention ratio after high-temperature continuous charging test (\%)} = (Q_4/Q_3) \times 100 \quad (3)$$

TABLE 4

| Battery | Positive electrode Lithium-transition metal composite oxide | Adhered element | Amount of adhered substance in terms of element (mass %) | Heat-treatment temperature (° C.) | Negative electrode active material | Atmosphere and duration of high-temperature continuous charging | Capacity retention ratio (%) | Battery thickness increase (mm) |
|---|---|---|---|---|---|---|---|---|
| B1 | LiCoO$_2$ | Er | 0.22 | 300 | Graphite | 60° C., 3 days | 84.5 | 1.01 |
| B2 | (Al 0.5 mol, | Yb | | 300 | | | 83.7 | 1.03 |
| Y2 | Mg 0.5 mol) | Al | | 120 | | | 61.5 | 2.89 |
| Y3 | | Al | | 500 | | | 58.5 | 3.55 |
| Y4 | | Er | | 500 | | | 78.9 | 2.52 |
| Y1 | | None | — | — | | | 52.7 | 6.88 |
| B3 | LiCoO$_2$ | Sm | 0.18 | 400 | | 60° C., 75 hours | 87.8 | 0.81 |
| B4 | (Al 0.5 mol, | Nd | | 400 | | | 87.8 | 0.81 |
| Y5 | Mg 0.5 mol, Zr 0.1 mol) | None | — | — | | | 55.2 | 3.85 |

The results shown in Table 4 clearly indicate that, as well as Reference Battery B1, in which an erbium compound (mainly erbium oxyhydroxide) was adhered to the surface of the lithium cobalt oxide particles, Reference Battery B2, in which a ytterbium compound (mainly ytterbium oxyhydroxide) was adhered to the surface of the lithium cobalt oxide particles, exhibited higher remaining capacity after high-temperature continuous charging and less battery thickness increase than Comparative Reference Batteries Y2 and Y3, in which aluminum hydroxide and aluminum oxide, respectively, were adhered to the surface of the lithium cobalt oxide particles, Comparative Reference Battery Y4, in which an erbium compound (mainly erbium oxide) was adhered to the surface of the lithium cobalt oxide particles, and Comparative Reference Battery Y1, in which no compound was present on the surface of the lithium cobalt oxide particles. In addition, Reference Batteries B3 and B4, in which a samarium compound and a neodymium compound, respectively, (mainly samarium oxyhydroxide and neodymium oxyhydroxide, respectively) are adhered to the surface of the lithium cobalt oxide particles, also exhibited higher remaining capacity after high-temperature continuous charging and less battery thickness increase than Comparative Reference Battery Y5, in which no compound is present on the surface of the lithium cobalt oxide particles. The reason is as follows.

When a lithium secondary battery is charged at a high voltage (e.g., at 4.40 V as in the above experiment), the positive electrode active material becomes strongly oxidative. Also, when the positive electrode active material contains a transition metal having catalytic property (such as Co, Fe, Ni, and Mn), the non-aqueous electrolyte solution and the decomposition product produced at the negative electrode further cause a reaction with the positive electrode on the positive electrode active material surface due to the transition metal having catalytic property. As a consequence, the charge-discharge cycle performance, the storage performance, and the performance after continuous charge of the lithium secondary battery considerably deteriorate. In addition, gas generation occurs in the battery, causing the battery to swell. Such deterioration of the lithium secondary battery is especially significant in a high-temperature environment.

In view of the problem, when hydroxides and oxyhydroxides of rare earth elements are caused to adhere to the surface of the lithium-transition metal composite oxide in a uniformly dispersed form, as in Reference Batteries B1 to B4, the catalytic property of the transition metals can be inhibited. The reason is believed to be as follows. Not only is the contacting between the non-aqueous electrolyte solution and the lithium-transition metal composite oxide lessened by the particles of the above-described compounds, but also the activation energy of the reaction for decomposing the electrolyte solution by the transition metals including nickel and cobalt having catalytic property is increased, which are contained in the lithium-transition metal composite oxide. As a result, the non-aqueous electrolyte solution is inhibited from reacting and decomposing at the surface of the positive electrode active material.

In contrast, the just-described advantageous effects are not obtained when no compound is present on the surface of the lithium-transition metal composite oxide particles, as in Comparative Reference Batteries Y1 and Y5. When hydroxide or oxide of aluminum is adhered to the surface of the lithium-transition metal composite oxide particles as in Comparative Reference Batteries Y2 and Y3, the contacting of the non-aqueous electrolyte solution and the lithium-transition metal composite oxide particles is inhibited by causing the particles of an aluminum compound, which are not involved in the charge-discharge reactions, to adhere to the surface of the lithium-transition metal composite oxide particles; however, the advantageous effect of increasing the activation energy of the decomposition reaction of the electrolyte solution, which originates from the transition metals contained in the lithium-transition metal composite oxide that have catalytic property, such as nickel and cobalt, is not obtained. As a consequence, the decomposition of the non-aqueous electrolyte solution cannot be sufficiently inhibited on the positive electrode active material surface. When erbium oxide is adhered to the surface of the lithium-transition metal composite oxide particles as in Comparative Reference Battery Y4, part of the erbium diffuses into the lithium-transition metal composite oxide particles. Consequently, the decomposition of the non-aqueous electrolyte solution cannot be sufficiently inhibited on the positive electrode active material surface.

As described above, the battery performance is improved not only in Reference Battery B1, in which an oxyhydroxide of erbium is adhered to the surface of the lithium-transition metal composite oxide particles, but also in Reference Batteries B2 to B4, in which oxyhydroxides of ytterbium, samarium, and neodymium are adhered to the surface of the lithium-transition metal composite oxide particles. Therefore, it is believed that battery characteristics such as the charge-discharge cycle performance can be improved also when the positive electrodes in which these compounds are formed on the surface of the lithium-transition metal composite oxide particles together with the negative electrode employing silicon.

Although the experiment was conducted for hydroxides and oxyhydroxides of erbium, ytterbium, samarium, and neodymium in the first Group of Reference Examples, it was confirmed by an experiment that the same advantageous effect could be obtained by hydroxides and oxyhydroxides of other rare earth elements (except for cerium and promethium).

Second Group of Reference Examples

Purpose of the Following Experiment

When the electrolyte solution contains FEC and the negative electrode employs silicon, the FEC in the electrolyte solution decomposes on the negative electrode surface and consequently gas generation occurs. This makes it difficult to observe the effect of inhibiting the oxidative decomposition reaction on the positive electrode surface. The following experiment was carried out to confirm the effect of inhibiting the oxidative decomposition reaction on the positive electrode surface.

Reference Example

A battery was fabricated in the same manner as described in the above-described Example in the Second Group of Examples, except for using the electrolyte solution (mixed solvent of EC and DEC) and the negative electrode (carbon negative electrode) that were used in Reference Example 1 in the First group of Reference Examples.

The battery fabricated in this manner is hereinafter referred to as Reference Battery B5.

Comparative Reference Example

A battery was fabricated in the same manner as described in the just-described Example, except that no erbium oxyhydroxide particle was adhered to the surface of the lithium-transition metal composite oxide which is the positive electrode active material.

The battery fabricated in this manner is hereinafter referred to as Comparative Reference Battery Y6.

Experiment

The above-described Reference Battery B5 and Comparative Reference Battery Y6 were charged and discharged under the following conditions to determine the battery thickness increase and the capacity retention ratio after the storage in a charged state. The results are shown in Table 5 below.

Initial Charging and Discharging
Temperature
25° C. (room temperature)
Charge Conditions
Each of the batteries was charged at a constant current of 800 mA to a battery voltage of 4.20 V and was thereafter charged at a constant voltage of 4.20 V until the current value reached 40 mA.
Discharge Conditions
Each of the lithium secondary batteries having been charged under the just-described initial charging conditions was rested for 5 minutes and thereafter discharged at a constant current of 800 mA until the battery voltage reached 2.50 V. The discharge capacity in this discharge was measured, and the discharge capacity obtained was defined as the initial discharge capacity Q5.
Storage Test in a Charged State
Temperature
85° C. (Each of the batteries was placed in a thermostatic chamber.)
Charge Conditions
Each of the batteries was charged at a constant current of 800 mA to a battery voltage of 4.20 V and thereafter further charged until the current value reached 40 mA while keeping the voltage at 4.20 V.
Storage Duration
3 hours.

The battery thickness of each of the batteries was measured before and after the storage in a charged state to determine the thickness increase for each of the batteries. The measurement was conducted in the same method as described in the foregoing experiment in the First Group of Examples.
Discharge Conditions
Each of the batteries was discharged at a constant current of 800 mA until the battery voltage reached 2.5 V. The discharge capacity in this discharge was measured, and the discharge capacity obtained was defined as the discharge capacity Q6.

Then, the capacity retention ratio (%) after the storage test in a charged state, represented by the following equation (4), was obtained from the above initial discharge capacity Q5 and the discharge capacity Q6 after stored in a charged state.

Capacity retention ratio after storage test in a charged state (%)=($Q6/Q5$)×100 (4)

TABLE 5

| Battery | Positive electrode | | | | Negative electrode active material | Capacity retention ratio (%) | Battery thickness increase (mm) |
|---|---|---|---|---|---|---|---|
| | Lithium-transition metal composite oxide | Adhered substance | Amount of adhered substance in terms of element (mass %) | Heat-treatment temperature (° C.) | | | |
| B5 | $Li_{1.05}Ni_{0.80}Co_{0.17}Al_{0.03}O_2$ | Erbium oxyhydroxide | 0.07 | 300 | Graphite | 92.0 | 0.42 |
| Y6 | | None | — | — | | 85.3 | 0.92 |

Table 5 clearly demonstrates that Reference Battery B5, in which erbium oxyhydroxide was adhered to the surface of the lithium-transition metal composite oxide particles, exhibited higher capacity retention ratio and less battery thickness increase than Comparative Reference Battery Y6, in which no substance was adhered to the surface of the lithium-transition metal composite oxide particles. This is believed to be for the same reason as described in the experiment of the First Group of Examples above.

As in the just-described comparison between Reference Battery B5 and Comparative Reference Battery Y6, the previously-described Battery A3 of the invention exhibited less battery thickness increase than Comparative Battery Z3. Accordingly, it is believed that the difference in battery thickness increase between Battery A3 of the invention and Comparative Battery Z3 came about because the erbium oxyhydroxide adhered to the positive electrode surface inhibited the oxidative decomposition reaction. Therefore, it is believed that the positive electrode that can inhibit the oxidative decomposition reaction when the negative electrode is graphite, as in Reference Battery B5 and Comparative Reference Battery Y6, can exhibit the same advantageous effects even when the electrolyte solution contains FEC and the negative electrode employs Si, as in Battery A3 of the invention and Comparative Battery Z3.

Third Group of Reference Examples

Purpose of the Following Experiment

It was investigated whether the same advantageous effects could be obtained when lithium-transition metal composite oxides other than $LiCoO_2$ and $Li_{1.05}Ni_{0.80}Co_{0.17}Al_{0.03}O_2$ were used.

Reference Example

A battery was fabricated in the same manner as described in Reference Example in the Second Group of Reference Examples, except that $LiMn_{0.33}Ni_{0.33}CO_{0.34}O_2$ prepared in the following manner was used as the lithium-transition metal composite oxide.

LiOH and a coprecipitated hydroxide represented as $Mn_{0.33}Ni_{0.33}CO_{0.34}(OH)_2$ were mixed in an Ishikawa-type Raikai mortar so that the mole ratio of Li to the whole of the transition metals became 1:1. Thereafter, the mixture was heat-treated at 1,000° C. for 20 hours in the air and thereafter pulverized, to thus obtain a lithium-transition metal composite oxide (average particle size 13 μm) represented as $LiMn_{0.33}Ni_{0.33}CO_{0.34}O_2$.

The battery fabricated in this manner is hereinafter referred to as Reference Battery B6.

Comparative Reference Example

A battery was fabricated in the same manner as described in the just-described Example, except that no erbium oxyhydroxide particle was adhered to the surface of the lithium-transition metal composite oxide which is the positive electrode active material.

The battery fabricated in this manner is hereinafter referred to as Comparative Reference Battery Y7.

Experiment

The above-described Reference Battery B6 and Comparative Reference Battery Y7 were charged and discharged under the following conditions to determine the battery thickness increase and the capacity retention ratio after the storage in a charged state. The results are shown in Table 6 below.

Initial Charging and Discharging
Temperature
25° C. (room temperature)
Charge Conditions Each of the batteries was charged at a constant current of 750 mA to a battery voltage of 4.40 V and was thereafter charged at a constant voltage of 4.40 V until the current value reached 37.5 mA.

Discharge Conditions

Each of the lithium secondary batteries having been charged under the just-described initial charging conditions was rested for 10 minutes, and thereafter discharged at a constant current of 750 mA until the battery voltage reached 2.75 V. The discharge capacity in this discharge was measured, and the discharge capacity obtained was defined as the initial discharge capacity Q5.

Storage Test in a Charged State
Temperature
60° C. (Each of the batteries was placed in a thermostatic chamber.)
Charge Conditions Each of the batteries was charged at a constant current of 750 mA to a battery voltage of 4.40 V and thereafter further charged until the current value reached 37.5 mA while keeping the voltage at 4.40 V.

Storage Duration
9 days.

The battery thickness of each of the batteries was measured before and after the storage in a charged state to determine the thickness increase for each of the batteries. The measurement was conducted in the same method as described in the foregoing experiment in the First Group of Examples.

Discharge Conditions

Each of the batteries was discharged at a constant current of 800 mA until the battery voltage reached 2.5 V. The discharge capacity in this discharge was measured, and the discharge capacity obtained was defined as the discharge capacity Q6 after the storage in a charged state.

Then, the capacity retention ratio (%) after storage test in a charged state was obtained by the foregoing equation (4).

TABLE 6

| | Positive electrode | | | | | | |
|---|---|---|---|---|---|---|---|
| Battery | Lithium-transition metal composite oxide | Adhered substance | Amount of adhered substance in terms of element (mass %) | Heat-treatment temperature (° C.) | Negative electrode active material | Capacity retention ratio (%) | Battery thickness increase (mm) |
| B6 | $LiMn_{0.33}Ni_{0.33}Co_{0.34}O_2$ | Erbium oxyhydroxide | 0.07 | 300 | Graphite | 87.0 | 0.36 |
| Y7 | | None | — | — | | 66.4 | 0.45 |

Table 6 clearly demonstrates that Reference Battery B6, in which erbium oxyhydroxide was adhered to the surface of the lithium-transition metal composite oxide particles, exhibited higher capacity retention ratio and less battery thickness increase than Comparative Reference Battery Y7, in which no substance was adhered to the surface of the lithium-transition metal composite oxide particles. This is believed to be for the same reason as described in the experiment of the First Group of Reference Examples above.

As described above, as well as the positive electrode containing Co in a relatively large proportion (as in the First Group of Examples and the First group of Reference Examples), the positive electrode containing Ni in a relatively large proportion (as in the Second Group of Examples and in the Second Group of Reference Examples) and the positive electrode containing approximately the same amount of Ni, Co, and Mn (as in the Third Reference Example) were able to inhibit the decomposition of the electrolyte solution and also to inhibit the decomposition product formed at the negative electrode from undergoing a reaction on the positive electrode. That is, the catalytic property of the above-described and other transition metals (such as Fe) can be inhibited by the hydroxides and oxyhydroxides of the rare earth elements adhered to the surface, and therefore, the reaction inhibiting effect of the present invention can be exhibited reliably.

The present invention is suitable for driving power sources for mobile information terminals such as mobile telephones, notebook computers, and PDAs, especially for use in applications that require a high capacity. The invention is also expected to be used for high power applications that require continuous operations under high temperature conditions, such as HEVs and power tools, in which the battery operates under severe operating environments.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A lithium secondary battery comprising:
   a positive electrode containing a positive electrode active material comprising particles of a lithium-transition metal composite oxide;
   a negative electrode containing a negative electrode active material comprising particles of silicon and/or silicon alloy;
   a separator interposed between the positive electrode and the negative electrode; and
   a non-aqueous electrolyte,
   wherein particles of at least one rare earth compound are adhered to a surface of the particles of the lithium-transition metal composite oxide in a uniformly dispersed form, the at least one rare earth compound being selected from the group consisting of erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, europium hydroxide, europium oxyhydroxide, gadolinium hydroxide, gadolinium oxyhydroxide, lanthanum hydroxide, lanthanum oxyhydroxide, scandium hydroxide, scandium oxyhydroxide, and a combination thereof, wherein
   the positive electrode active material is prepared by adding a solution of salt selected from the group consisting of erbium salt, ytterbium salt, terbium salt, dysprosium salt, holmium salt, thulium salt, lutetium salt, neodymium salt, samarium salt, praseodymium salt, europium salt, gadolinium salt, lanthanum salt and scandium salt to a solution dispersing the particles of the lithium-transition metal composite oxide;
   depositing a hydroxide selected from erbium hydroxide, ytterbium hydroxide, terbium hydroxide, dysprosium hydroxide, holmium hydroxide, thulium hydroxide, lutetium hydroxide, neodymium hydroxide, samarium hydroxide, praseodymium hydroxide, europium hydroxide, gadolinium hydroxide, lanthanum hydroxide, and scandium hydroxide to the surface of the particles of the lithium-transition metal composite oxide; and
   heat-treating the particles of the lithium-transition metal composite oxide depositing the hydroxide to the surface, wherein a pH of the solution dispersing the particles of the lithium-transition metal composite oxide is from 7 to 10.

2. The lithium secondary battery according to claim 1, wherein the particles of the at least one rare earth compound have an average particle size of from 1 nm to 100 nm.

3. The lithium secondary battery according to claim 1, wherein the at least one rare earth compound being selected from the group consisting of erbium hydroxide, erbium oxyhydroxide, ytterbium hydroxide, ytterbium oxyhydroxide, neodymium hydroxide, neodymium oxyhydroxide, samarium hydroxide and samarium oxyhydroxide.

4. The lithium secondary battery according to claim 1, wherein the amount of the adhering rare earth compound is from 0.005 mass % to 0.5 mass % in terms of elemental rare earth based on the mass of the lithium-transition metal composite oxide.

5. The lithium secondary battery according to claim 4, wherein the amount of the adhering rare earth compound is from 0.01 mass % to 0.3 mass % in terms of elemental rare earth based on the mass of the lithium-transition metal composite oxide.

6. A lithium secondary battery comprising:
   a positive electrode containing a positive electrode active material comprising particles of a lithium-transition metal composite oxide;
   a negative electrode containing a negative electrode active material comprising particles of silicon and/or silicon alloy;
   a separator interposed between the positive electrode and the negative electrode; and
   a non-aqueous electrolyte,
   wherein particles of at least one rare earth compound are adhered to a surface of the particles of the lithium-transition metal composite oxide in a dispersed form,
   the at least one rare earth compound being selected from the group consisting of erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, praseodymium oxyhydroxide, europium hydroxide, europium oxyhydroxide, gadolinium hydroxide, gadolinium oxyhydroxide, lanthanum hydroxide, lanthanum oxyhydroxide, scandium hydroxide, scandium oxyhydroxide, and a combination thereof, and the particles of the at least one rare earth compound have an average particle size of from 1 nm to 100 nm.

7. The lithium secondary battery according to claim 6, wherein the lithium-transition metal composite oxide has a layered structure and is represented by the chemical formula $Li_aNi_xCo_yM_zO_2$, where $0 \leq a \leq 1.1$, $x+y+z=1$, $0 \leq x \leq 1$, $0 \leq y \leq 1$, $0 \leq z \leq 1$, and M is at least one element selected from the group consisting of Mn, Al, Zr, Mg, Ti, and Mo.

8. The lithium secondary battery according to claim 7, wherein the at least one rare earth compound being selected from the group consisting of erbium hydroxide and erbium oxyhydroxide.

9. The lithium secondary battery according to claim 6, wherein the at least one rare earth compound being selected from the group consisting of erbium hydroxide and erbium oxyhydroxide.

10. A lithium secondary battery according to claim 6, wherein the group of the at least one rare earth compound consists of erbium hydroxide, erbium oxyhydroxide, ytterbium hydroxide, ytterbium oxyhydroxide, neodymium hydroxide, neodymium oxyhydroxide, samarium hydroxide, samarium oxyhydroxide, and a combination thereof.

11. The lithium secondary battery according to claim 6, wherein the amount of the adhering rare earth compound is from 0.005 mass % to 0.5 mass % in terms of elemental rare earth based on the mass of the lithium-transition metal composite oxide.

12. The lithium secondary battery according to claim 11, wherein the amount of the adhering rare earth compound is from 0.01 mass % to 0.3 mass % in terms of elemental rare earth based on the mass of the lithium-transition metal composite oxide.

13. A lithium secondary battery comprising:
a positive electrode containing a positive electrode active material comprising particles of a lithium-transition metal composite oxide;
a negative electrode containing a negative electrode active material comprising a carbon material;
a separator interposed between the positive electrode and the negative electrode; and
a non-aqueous electrolyte,
wherein particles of at least one rare earth compound are adhered to a surface of the particles of the lithium-transition metal composite oxide in a dispersed form,
the at least one rare earth compound being selected from the group consisting of erbium hydroxide, erbium oxyhydroxide, ytterbium hydroxide, ytterbium oxyhydroxide, terbium hydroxide, terbium oxyhydroxide, dysprosium hydroxide, dysprosium oxyhydroxide, holmium hydroxide, holmium oxyhydroxide, thulium hydroxide, thulium oxyhydroxide, lutetium hydroxide, lutetium oxyhydroxide, neodymium hydroxide, neodymium oxyhydroxide, samarium hydroxide, samarium oxyhydroxide, praseodymium hydroxide, praseodymium oxyhydroxide, europium hydroxide, europium oxyhydroxide, gadolinium hydroxide, gadolinium oxyhydroxide, lanthanum hydroxide, lanthanum oxyhydroxide, scandium hydroxide, scandium oxyhydroxide, and a combination thereof, and the particles of the at least one rare earth compound have an average particle size of from 1 nm to 100 nm.

14. The lithium secondary battery according to claim 13, wherein the lithium-transition metal composite oxide has a layered structure and is represented by the chemical formula $Li_aNi_xCo_yM_zO_2$, where $0 \leq a \leq 1.1$, $x+y+z=1$, $0 \leq x \leq 1$, $0 \leq y \leq 1$, $0 \leq z \leq 1$, and M is at least one element selected from the group consisting of Mn, Al, Zr, Mg, Ti, and Mo.

15. The lithium secondary battery according to claim 13, wherein the at least one rare earth compound being selected from the group consisting of erbium hydroxide and erbium oxyhydroxide.

16. A lithium secondary battery according to claim 13, wherein the group of the at least one rare earth compound consists of erbium hydroxide, erbium oxyhydroxide, ytterbium hydroxide, ytterbium oxyhydroxide, neodymium hydroxide, neodymium oxyhydroxide, samarium hydroxide, samarium oxyhydroxide, and a combination thereof.

17. The lithium secondary battery according to claim 13, wherein the amount of the adhering rare earth compound is from 0.005 mass % to 0.5 mass % in terms of elemental rare earth based on the mass of the lithium-transition metal composite oxide.

18. The lithium secondary battery according to claim 17, wherein the amount of the adhering rare earth compound is from 0.01 mass % to 0.3 mass % in terms of elemental rare earth based on the mass of the lithium-transition metal composite oxide.

* * * * *